United States Patent
Nakanishi et al.

(10) Patent No.: US 12,089,295 B2
(45) Date of Patent: Sep. 10, 2024

(54) MULTIPLE VIRTUAL INTERFACES THROUGH A SINGLE PHYSICAL INTERFACE

(71) Applicant: ARRIS Enterprises LLC, Suwanee, GA (US)

(72) Inventors: Gregory Nobutaka Nakanishi, San Diego, CA (US); Kwoktung Brian Lo, Palo Alto, CA (US); Ken Haase, Pleasanton, CA (US)

(73) Assignee: ARRIS ENTERPRISES LLC, Horsham, PA (US)

( * ) Notice: Subject to any disclaimer, the term of this patent is extended or adjusted under 35 U.S.C. 154(b) by 349 days.

(21) Appl. No.: 17/314,733

(22) Filed: May 7, 2021

(65) Prior Publication Data

US 2022/0030665 A1   Jan. 27, 2022

Related U.S. Application Data

(60) Provisional application No. 63/057,004, filed on Jul. 27, 2020.

(51) Int. Cl.
*H04W 88/16*   (2009.01)
*H04L 12/46*   (2006.01)
(Continued)

(52) U.S. Cl.
CPC ......... *H04W 88/16* (2013.01); *H04L 12/4641* (2013.01); *H04W 8/26* (2013.01);
(Continued)

(58) Field of Classification Search
None
See application file for complete search history.

(56) References Cited

U.S. PATENT DOCUMENTS 7,458,092 B1 * 11/2008 Parker .............. H04N 21/42204
725/120
11,184,191 B1 * 11/2021 Indiradevi .......... H04L 63/0227
(Continued)

OTHER PUBLICATIONS

International Search Report and the Written Opinion of the International Searching Authority dated Sep. 3, 2021 in International (PCT) Application No. PCT/US2021/033318.
(Continued)

*Primary Examiner* — Jeffrey M Rutkowski
*Assistant Examiner* — Mehedi S Aley
(74) *Attorney, Agent, or Firm* — Wenderoth, Lind & Ponack, L.L.P.

(57) ABSTRACT

A method for providing multiple virtual interfaces over a single physical interface of a gateway device includes configuring a first physical Wi-Fi interface with a first virtual interface for a WAN side and a second virtual interface for a LAN side by assigning SSIDs to the first virtual interface and the second virtual interface, and storing the SSIDs as virtual interface configuration data. The method further includes determining whether a packet is received over the first virtual interface or the second virtual interface based on the virtual interface configuration data, and performing virtual input processing to manage flow of the packet to a router, depending on the input virtual interface, by tagging the packet as WAN traffic associated with the first virtual interface based on the WAN SSID or as LAN traffic associated with the second virtual interface based on the LAN SSID, and forwarding the packet to the router.

19 Claims, 9 Drawing Sheets

(51) Int. Cl.
*H04W 8/26* (2009.01)
*H04W 28/02* (2009.01)
*H04W 48/16* (2009.01)
*H04W 84/12* (2009.01)

(52) U.S. Cl.
CPC ....... *H04W 28/0268* (2013.01); *H04W 48/16* (2013.01); *H04W 84/12* (2013.01)

(56) References Cited

U.S. PATENT DOCUMENTS

| | | | | |
|---|---|---|---|---|
| 2006/0165103 | A1* | 7/2006 | Trudeau | H04L 12/2854 370/428 |
| 2012/0243521 | A1* | 9/2012 | Zhang | H04L 69/167 370/338 |
| 2015/0016260 | A1* | 1/2015 | Chow | H04L 45/245 370/235 |
| 2016/0094662 | A1* | 3/2016 | Kollu | H04L 43/0882 709/224 |
| 2018/0262364 | A1* | 9/2018 | Guan | H04L 12/4625 |

OTHER PUBLICATIONS

International Preliminary Report on Patentability dated Jan. 31, 2023 in International (PCT) Application No. PCT/US2021/033318.

* cited by examiner

MULTIPLE VIRTUAL INTERFACES THROUGH A SINGLE PHYSICAL INTERFACE

BACKGROUND

As gigabit wireless devices become more commonplace, the 2.4 GHz and 5 GHz radio frequency bands that are currently utilized for Wi-Fi lack a sufficient amount of spectrum to support an ever-growing number of client devices and increasing data speed demands. It is getting harder to find clean spectrum in both the 2.4 GHz and 5 GHz bands.

Despite support for wider 160 MHz channels in the IEEE 802.11ac (Wi-Fi 5) standard and the IEEE 802.11ax (Wi-Fi 6) standard, few client devices are able to actually utilize the 160 MHz channels in the 5 GHz band because the dynamic frequency selection (DFS) feature is often disabled by default. DFS prevents Wi-Fi devices operating in the 5 GHz band from interfering with radars that are licensed to use the channels in that band. However, wideband unlicensed channels of 160 MHz (or more) may become essential to achieve the expected performance gains from the 802.11ax (Wi-Fi 6) standard, the 802.11be (Wi-Fi 7) standard, 4G LTE, and 5G NR in the unlicensed spectrum.

In order to address exhaustion of the available spectrum capacity in the 5 GHz band, unlicensed use of the 6 GHz band (5.925 GHz-7.125 GHz) for Wi-Fi has been approved by the FCC in April 2020. Opening up a contiguous 1200 MHz chunk of spectrum above the 5 GHz band will enable a substantial amount of new bandwidth over multiple wideband channels. Introduction of the 6 GHz band for Wi-Fi use will provide enough spectrum to safely deploy 80 MHz and 160 MHz wide channels, with high throughput rates (higher data speeds, lower latency) and congestion-free network access with less interference from legacy devices. The 6 GHz band will accommodate up to 14 additional 80 MHz channels and 7 additional 160 MHz channels.

Wireless devices that are capable of 6 GHz operation (Wi-Fi over 6 GHz radios) are referred to as Wi-Fi 6E devices, and will provide the benefits of the IEEE 802.11ax (Wi-Fi 6) standard (higher performance in terms of faster data rates and lower latency) in the 6 GHz band. Wi-Fi 6E devices can make use of the wider channels and additional capacity to provide better performance and support denser deployments. Thus, Wi-Fi 6E devices will be able to provide clean uncongested bandwidth and enable multi-gigabit data speeds. The 6 GHz Wi-Fi technology allows new high bandwidth, low latency, and high quality-of-service (QoS) services to be built on it. Developing technology for Wi-Fi in the 6 GHz band will be essential for residential multi-access point and mesh network, multiple dwelling unit (MDU) single-access point networks, high-density enterprise networks, indoor public venues, industrial Internet of Things (IoT), etc.

The terms 'residential gateway' (RG) or 'home router' have been used by telecommunications multiple service operators (MSOs) as a termination device for connecting consumer premises to a broadband delivery network. An RG device connects the client devices on a local area network (LAN) to a wide area network (e.g., the Internet).

In a residential gateway device (also referred to as RG, GW, access point or AP), 6 GHz radios can be used as both a Wide Area Network (WAN) interface and a local area network (LAN) interface. Typically, the physical WAN interface is a different technology from the physical LAN interface. Common WAN interfaces include DOCSIS over coax, xDSL, fiber, and LTE, for example. These are interfaces to the service provider network that user equipment (e.g., phones, laptops, set-top boxes, etc.) do not usually have. Common LAN interfaces include Ethernet and Wi-Fi, with one or both interfaces being commonly supported in the user equipment. Thus, physically separate interfaces between the WAN and the LAN are required in the existing related technology (with the exception of Ethernet, which is common as both a WAN and LAN technology). An Ethernet WAN is often used when the router is connected to another access device, such as a DSL modem, cable modem, or ONT, for example.

There are various functions and policies on the WAN interface between the router and the service provider network that differ from functions and policies on the LAN interfaces. For example, the router must authenticate with the service provider network on the WAN interface, and remote device management by the service provider network is only enabled/allowed over the WAN interface. On the LAN side, the router is responsible for authenticating user equipment (not authenticating with the service provider over the WAN interface). In addition, the LAN interface and WAN interface need a router/firewall function between them, which is easier to implement when the interfaces are physically different.

Until recently, the LAN interface speeds have not been fast enough to handle both WAN traffic and LAN traffic simultaneously. With the anticipated availability of the 6 GHz spectrum for Wi-Fi and the higher speeds supported by IEEE 802.11ax (Wi-Fi 6E), as well as 10G Ethernet now starting to be considered as a LAN interface, these interfaces are becoming fast enough to support both LAN traffic and WAN traffic at the same time. A main attraction of the 6 GHz spectrum is that it is new clean spectrum without very much interference to reduce throughput (at least not until widely implemented after some time), and there is a lot of bandwidth available as compared to the 5 GHz and 2.4 GHz spectrums. However, implementing an RG, GW, or AP with a first 6 GHz Wi-Fi radio for the WAN interface and a second 6 GHz Wi-Fi radio for the LAN interface is expensive. Accordingly, it would be desirable to develop a solution in which a single 6 GHz Wi-Fi radio can be used as both the WAN interface and the LAN interface.

SUMMARY

Aspects of the present disclosure provide novel solutions for enabling a network gateway device to operate using virtual interfaces. The gateway device includes a single physical Wi-Fi radio configured with two separate virtual interfaces (or logical interfaces) for WAN traffic and LAN traffic, respectively.

An aspect of the present disclosure provides a gateway device for providing multiple virtual interfaces over a single physical interface of the gateway device. The gateway device includes a memory storing computer-readable instructions, and a processor configured to execute the computer-readable instructions to configure a first physical Wi-Fi interface of the gateway device with a first virtual interface for a wide area network (WAN) side of the gateway device and a second virtual interface for a local area network (LAN) side of the gateway device. When configuring the first physical Wi-Fi interface, the processor is further configured to assign a first service set identifier (WAN SSID) to the first virtual interface for the WAN side of the gateway device, assign a second service set identifier (LAN SSID) to the second virtual interface for the LAN side of the gateway device, and store the WAN SSID and the LAN SSID in the memory of the gateway device as virtual interface configuration data associated with the first physical Wi-Fi interface. The processor is further configured to execute the computer-readable instructions to receive a packet at a physical Wi-Fi interface of the gateway device, determine whether the packet is received over the first virtual interface for the WAN side or the second virtual interface for the LAN side based on the virtual interface configuration data stored in the memory of the gateway device, and in response to determining that the packet is received over the first virtual interface for the WAN side or the second virtual interface for the LAN side, perform virtual input processing to manage flow of the packet to a router of the gateway device depending on the input virtual interface. When performing the virtual input processing, the processor is further configured to tag the packet as WAN traffic associated with the first virtual interface based on the WAN SSID, or tag the packet as LAN traffic associated with the second virtual interface based on the LAN SSID, and forward the packet to the router of the gateway device for packet forward processing.

In an aspect of the present disclosure, configuring the first physical Wi-Fi interface with the first virtual interface for the WAN side and the second virtual interface for the LAN side further includes creating a respective quality of service (QoS) policy for each of the WAN SSID assigned to the first virtual interface for the WAN side and the LAN SSID assigned to the second virtual interface for the LAN side, and storing the respective QoS policy in association with each of the WAN SSID and the LAN SSID in the memory of the apparatus as the virtual interface configuration data associated with the first physical Wi-Fi interface.

In an aspect of the present disclosure, when performing the virtual input processing to manage the flow of the packet to the router of the gateway device depending on the input virtual interface, the processor is further configured to tag the packet with the WAN SSID or a virtual WAN (vWAN) tag in response to determining that the packet is received over the first virtual interface for the WAN side, and tag the packet with the LAN SSID or a virtual LAN (vLAN) tag in response to determining that the packet is received over the second virtual interface for the LAN side.

In an aspect of the present disclosure, the processor of the gateway device is further configured to execute the computer-readable instructions to receive the packet at the router of the gateway device, wherein the router performs the packet forward processing and outputs the packet, determine whether the packet output from the router is to be transmitted over the first virtual interface for the WAN side or the second virtual interface for the LAN side based on the virtual interface configuration data stored in the memory of the gateway device or based on the tagging of the packet, and in response to determining that the packet is to be transmitted over the first virtual interface for the WAN side or the second virtual interface for the LAN side, perform virtual output processing to manage flow of the packet to the first physical Wi-Fi interface depending on the output virtual interface.

In an aspect of the present disclosure, when performing the virtual output processing to manage the flow of the packet to the first physical Wi-Fi interface depending on the output virtual interface, the processor is further configured to apply a first QoS policy for the WAN SSID in response to determining that the packet is to be transmitted over the first virtual interface for the WAN side, or apply a second QoS policy for the LAN SSID in response to determining that the packet is to be transmitted over the second virtual interface for the LAN side, and forward the packet to the first physical Wi-Fi interface. The processor is further configured to execute the computer-readable instructions to receive the packet at the first physical Wi-Fi interface of the gateway device, and output the packet at the first physical Wi-Fi interface of the gateway device over the first virtual interface for the WAN side in accordance with the first QoS policy for the WAN SSID, or over the second virtual interface for the LAN side in accordance with the second QoS policy for the LAN SSID.

In an aspect of the present disclosure, the first physical Wi-Fi interface is a single 6 GHz radio that is virtualized to provide both a WAN interface and a LAN interface using the same 6 GHz radio, and the first virtual interface associated with the WAN SSID provides a dedicated 6 GHz wireless backhaul between a WAN adaptor connected to the WAN side of the gateway device, the gateway device, and one or more extender devices connected to the LAN side of the gateway device. The WAN adaptor associates to the WAN SSID of the first virtual interface for the WAN side of the gateway device and the one or more extender devices associate to the LAN SSID of the second virtual interface for the LAN side of the gateway device.

In an aspect of the present disclosure, the respective QoS policy for the WAN SSID or the LAN SSID includes one or more of allocating a first portion of available 6 GHz bandwidth to the WAN SSID associated with the first virtual interface for the WAN side, and allocating a second portion of the available 6 GHz bandwidth to the LAN SSID associated with the second virtual interface for the LAN side, allocating one or more sub-portions of the second portion of the available 6 GHz bandwidth to one or more client devices connected to the second virtual interface for the LAN side, assigning a priority among different services over each of the first virtual interface for the WAN side and the second virtual interface for the LAN side, and assigning a priority among different client devices over each of the first virtual interface for the WAN side and the second virtual interface for the LAN side.

An aspect of the present disclosure provides a method for providing multiple virtual interfaces over a single physical interface of a gateway device. The method includes configuring a first physical Wi-Fi interface of the gateway device with a first virtual interface for a wide area network (WAN) side of the gateway device and a second virtual interface for a local area network (LAN) side of the gateway device. Configuring the first physical Wi-Fi interface includes assigning a first service set identifier (WAN SSID) to the first virtual interface for the WAN side of the gateway device, assigning a second service set identifier (LAN SSID) to the second virtual interface for the LAN side of the gateway device, and storing the WAN SSID and the LAN SSID in a memory of the gateway device as virtual interface configuration data associated with the first physical Wi-Fi interface. The method further includes receiving a packet at a physical Wi-Fi interface of the gateway device, determining whether the packet is received over the first virtual interface for the WAN side or the second virtual interface for the LAN side based on the virtual interface configuration data stored in the memory of the gateway device, and in response to determining that the packet is received over the first virtual interface for the WAN side or the second virtual interface for the LAN side, performing virtual input processing to manage flow of the packet to a router of the gateway device depending on the input virtual interface. The virtual input processing includes tagging the packet as WAN traffic associated with the first virtual interface based on the WAN SSID, or tagging the packet as LAN traffic associated with the second virtual interface based on the LAN SSID, and forwarding the packet to the router of the gateway device for packet forward processing.

In an aspect of the present disclosure, configuring the first physical Wi-Fi interface with the first virtual interface for the WAN side and the second virtual interface for the LAN side further includes creating a respective quality of service (QoS) policy for each of the WAN SSID assigned to the first virtual interface for the WAN side and the LAN SSID assigned to the second virtual interface for the LAN side, and storing the respective QoS policy in association with each of the WAN SSID and the LAN SSID in the memory of the gateway device as the virtual interface configuration data associated with the first physical Wi-Fi interface.

In an aspect of the present disclosure, performing the virtual input processing to manage the flow of the packet to the router of the gateway device depending on the input virtual interface includes tagging the packet with the WAN SSID or a virtual WAN (vWAN) tag in response to determining that the packet is received over the first virtual interface for the WAN side, and tagging the packet with the LAN SSID or a virtual LAN (vLAN) tag in response to determining that the packet is received over the second virtual interface for the LAN side.

In an aspect of the present disclosure, the method further includes receiving the packet at the router of the gateway device, wherein the router performs the packet forward processing and outputs the packet, determining whether the packet output from the router is to be transmitted over the first virtual interface for the WAN side or the second virtual interface for the LAN side based on the virtual interface configuration data stored in the memory of the gateway device or based on the tagging of the packet, and in response to determining that the packet is to be transmitted over the first virtual interface for the WAN side or the second virtual interface for the LAN side, performing virtual output processing to manage flow of the packet to the first physical Wi-Fi interface depending on the output virtual interface.

In an aspect of the present disclosure, performing the virtual output processing to manage the flow of the packet to the first physical Wi-Fi interface depending on the output virtual interface includes applying a first QoS policy for the WAN SSID in response to determining that the packet is to be transmitted over the first virtual interface for the WAN side, or applying a second QoS policy for the LAN S SID in response to determining that the packet is to be transmitted over the second virtual interface for the LAN side, and forwarding the packet to the first physical Wi-Fi interface. The method further includes receiving the packet at the first physical Wi-Fi interface of the gateway device, and outputting the packet at the first physical Wi-Fi interface of the gateway device over the first virtual interface for the WAN side in accordance with the first QoS policy for the WAN SSID, or over the second virtual interface for the LAN side in accordance with the second QoS policy for the LAN SSID.

An aspect of the present disclosure provides a non-transitory computer-readable medium storing a program for providing multiple virtual interfaces over a single physical interface. The program, when executed by a processor of a gateway device, causes the gateway device to perform operations including the steps of the methods described above.

The above-described method and computer-readable medium may be implemented in a residential gateway (RG) or other home network gateway device according to some example embodiments. However, some other example embodiments are not limited thereto, and the method and computer-readable medium may be implemented by a wireless extender, or a wireless access point (AP), or other similar electronic devices that enable wireless networking.

Thus, according to various aspects of the present disclosure described herein, it is possible to seamlessly receive/transmit and distinguish both LAN traffic and WAN traffic over a single physical interface by implementing a virtual interface technique. The solution may also be implemented by a Residential Gateway (RG), a wireless access point (AP), a Wi-Fi extender, or the like. The solution would effectively reduce the cost of wireless networking devices, such as RGs, GWs, APs, wireless extenders, and the like as compared to implementations that require two separate physical Wi-Fi radios for the WAN traffic and the LAN traffic.

BRIEF DESCRIPTION OF DRAWINGS

In the drawings, like reference numbers generally indicate identical, functionally similar, and/or structurally similar elements.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded as merely examples. Accordingly, those of ordinary skill in the art will recognize that various changes and modifications of the examples described herein can be made without departing from the spirit and scope of the present disclosure. In addition, descriptions of well-known functions and constructions may be omitted for clarity and conciseness.

The terms and words used in the following description and claims are merely used to enable a clear and consistent understanding of the present disclosure. Accordingly, it should be apparent to those skilled in the art that the following description is provided for illustration purposes only, and not for the purpose of limiting the present disclosure as defined by the appended claims.

Figure 1:
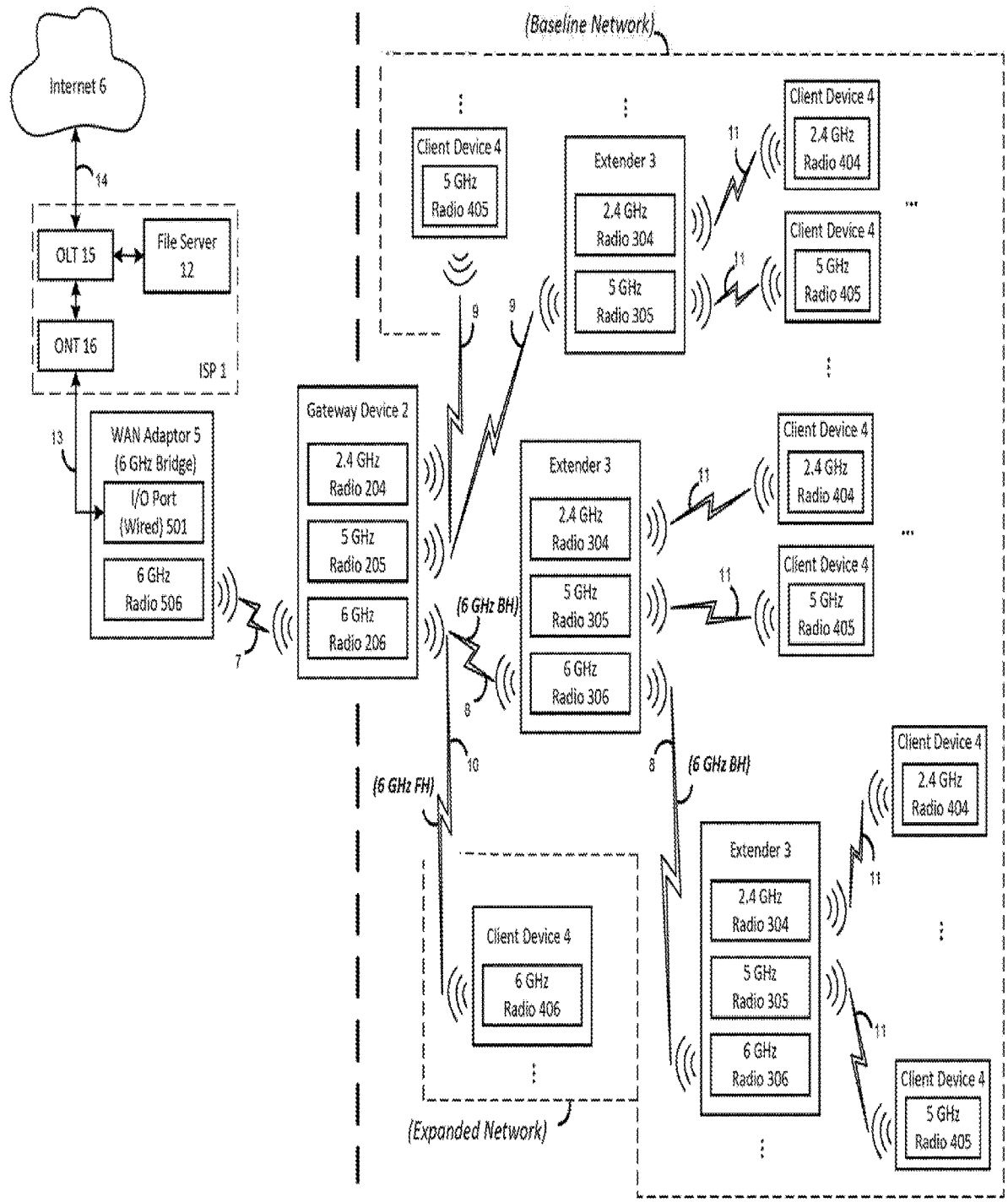
FIG. 1 is a schematic diagram of a system, according to an embodiment of the present disclosure.

FIG. 1 is a schematic diagram of a system, according to an embodiment of the present disclosure.

It should be appreciated that various example embodiments of inventive concepts disclosed herein are not limited to specific numbers or combinations of devices, and there may be one or multiple of some of the aforementioned electronic apparatuses in the system, which may itself consist of multiple communication networks and various known or future developed wireless connectivity technologies, protocols, devices, and the like.

As shown in FIG. 1, the main elements of the system include a gateway device 2 connected to the Internet 6 via an Internet Service Provider (ISP) 1 and a wide area network (WAN) adaptor 5, and also connected to different wireless devices such as wireless extenders 3 and client devices 4. The system shown in FIG. 1 includes wireless devices (e.g., wireless extenders 3 and client devices 4) that may be connected in one or more wireless networks (e.g., private, guest, iControl, backhaul network, or Internet of things (IoT) network) within the system. Additionally, there could be some overlap between wireless devices (e.g., wireless extenders 3 and client devices 4) in the different networks. That is, one or more network devices could be located in more than one network. For example, the wireless extenders 3 could be located both in a private network for providing content and information to a client device 4 and also included in a backhaul network or an iControl network.

Starting from the top of FIG. 1, the ISP 1 can be, for example, a streaming video provider or any computer for connecting the gateway device 2 to the Internet 6. The ISP 1 may have various hardware components associated therewith, including but not limited to a file server 12, an optical line terminal (OLT) 15, and an optical network terminal (ONT) 16.

The connection 14 between the Internet 6 and the ISP 1 can be implemented using a wide area network (WAN), a virtual private network (VPN), metropolitan area networks (MANs), system area networks (SANs), a DOCSIS network, a fiber optics network (e.g., FTTH (fiber to the home) or FTTX (fiber to the x), or hybrid fiber-coaxial (HFC)), a digital subscriber line (DSL), a public switched data network (PSDN), a global Telex network, or a 2G, 3G, 4G or 5G network, for example.

The wide area network (WAN) adaptor 5 can be a hardware electronic device that provides an interface between the Internet 6 via the ISP 1, and the gateway device 2. The WAN adaptor 5 may include various components, including but not limited to an input/output (I/O) port 501 (wired connection interface) such as an Ethernet port, a cable port, a fiber optic port, or the like, and a 6 GHz radio 506 (wireless connection interface). The WAN adaptor 5 "adapts" the 6 GHz interface to an interface supported by the ISP-provided WAN access device (e.g., a connection 13, such as Ethernet, to the ONT 16). Thus, the WAN adaptor 5 serves as a "6 GHz to Ethernet Bridge" connecting the gateway device 2 to the Internet 6, according to example embodiments of the present disclosure. Other types of WAN access devices include a DOCSIS modem, a DSL modem, and a fixed wireless modem. In some example embodiments, the WAN adaptor 5 may be a separate device that sits in between an ISP-provided modem, modem/router combination or the like, and the gateway device 2.

The connection 13 between the ISP 1 (e.g., via the ONT 16) and the WAN adaptor 5 can be implemented using a wide area network (WAN), a virtual private network (VPN), metropolitan area networks (MANs), system area networks (SANs), a DOCSIS network, a fiber optics network (e.g., FTTH (fiber to the home) or FTTX (fiber to the x), or hybrid fiber-coaxial (HFC)), a digital subscriber line (DSL), a public switched data network (PSDN), a global Telex network, or a 2G, 3G, 4G or 5G network, for example. The connection 13 can further include as some portion thereof a broadband mobile phone network connection, an optical network connection, or other similar connections. For example, the connection 13 can also be implemented using a fixed wireless connection that operates in accordance with, but is not limited to, 3rd Generation Partnership Project (3GPP) Long Term Evolution (LTE) or 5G protocols. It is also contemplated by the present disclosure that connection 13 between the WAN adaptor 5 and the ISP 1 is capable of providing connections between the gateway device 2 and a WAN, a LAN, a VPN, MANs, PANs, WLANs, SANs, a DOCSIS network, a fiber optics network (e.g., FTTH, FTTX, or HFC), a PSDN, a global Telex network, or a 2G, 3G, 4G or 5G network, for example.

The gateway device 2 can be, for example, a hardware electronic device that may be a combination modem and network gateway device that combines the functions of a modem, an access point (AP), and/or a router for providing content received from the ISP 1 to network devices (e.g., wireless extenders 3 and client devices 4) in the system. It is also contemplated by the present disclosure that the gateway device 2 can include the function of, but is not limited to, an Internet Protocol/Quadrature Amplitude Modulator (IP/QAM) set-top box (STB) or smart media device (SMD) that is capable of decoding audio/video content, and playing over-the-top (OTT) or multiple system operator (MSO) provided content. The gateway device 2 may also be referred to as a residential gateway (RG), a broadband access gateway, a home network gateway, a home router, or a wireless access point (AP).

The gateway device 2 can include one or more wired interfaces (e.g., an Ethernet port, a cable port, a fiber optic port, or the like) and multiple wireless interfaces, including but not limited to a 2.4 GHz radio 204, a 5 GHz radio 205, and a 6 GHz radio 206.

The connection 7 between the gateway device 2 and the WAN adaptor 5 and the connection 8 between the gateway device 2 and the wireless extenders 3 are implemented through a wireless connection that operates in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, or 6 GHz bands. One or more of the connection 7 and/or the connection 8 can also be a wired Ethernet connection.

The connection 7 between the gateway device 2 and the WAN adaptor 5 may be implemented via the 6 GHz radio 206 of the gateway device 2 and the 6 GHz radio 506 of the WAN adaptor 5, for example. The connection 7 enables the gateway device 2 and the WAN adaptor 5 to establish a dedicated 6 GHz wireless backhaul (6 GHz BH) according to example embodiments of the present disclosure. However, the connection 7 could also be implemented using respective wired interfaces (e.g., Ethernet, cable, fiber optic, or the like) in some alternative example embodiments.

The connection 8 between the gateway device 2 and the wireless extenders 3 can be implemented using the 6 GHz radio 206 of the gateway device 2 and the 6 GHz radios 306 of the wireless extenders 3, for example. The connection 8 enables the gateway device 2 and the wireless extenders 3 to establish a dedicated 6 GHz wireless backhaul (6 GHz BH) according to example embodiments of the present disclosure. However, the connection 8 could also be implemented using respective wired interfaces (e.g., Ethernet, cable, fiber optic, or the like) in some alternative example embodiments.

The connection 9 between the gateway device 2, the wireless extenders 3, and client devices 4 can be implemented using a wireless connection in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the citizens broadband radio service (CBRS) band, 2.4 GHz bands, 5 GHz bands, or 6 GHz bands. Additionally, the connection 9 can be implemented using a wireless connection that operates in accordance with, but is not limited to, RF4CE protocol, ZigBee protocol, Z-Wave protocol, or IEEE 802.15.4 protocol. It is also contemplated by the present disclosure that the connection 9 can include connections to a media over coax (MoCA) network. One or more of the connections 9 can also be a wired Ethernet connection.

The wireless extenders 3 can be, for example, hardware electronic devices such as access points (APs) used to extend the wireless network by receiving the signals transmitted by the gateway device 2 and rebroadcasting the signals to, for example, client devices 4, which may out of range of the gateway device 2. The wireless extenders 3 can also receive signals from the client devices 4 and rebroadcast the signals to the gateway device 2, or other client devices 4.

The connection 8 between respective wireless extenders 3 is implemented through a wireless connection that operates in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, or 6 GHz bands. The connection 8 can also be a wired Ethernet connection.

The connection 8 between respective wireless extenders 3 can be implemented using the 6 GHz radio 306 of the wireless extenders 3, for example. The connection 8 enables the wireless extenders 3 to establish a dedicated 6 GHz wireless backhaul (6 GHz BH) according to example embodiments of the present disclosure. However, the connection 8 could also be implemented using respective wired interfaces (e.g., Ethernet, cable, fiber optic, or the like) in some alternative example embodiments.

The client devices 4 can be, for example, hand-held computing devices, personal computers, electronic tablets, smart phones, smart speakers, Internet-of-Things (IoT) devices, iControl devices, portable music players with smart capabilities capable of connecting to the Internet, cellular networks, and interconnecting with other devices via Wi-Fi and Bluetooth, or other wireless hand-held consumer electronic devices capable of executing and displaying content received through the gateway device 2. Additionally, the client devices 4 can be a television (TV), an IP/QAM set-top box (STB) or a streaming media decoder (SMD) that is capable of decoding audio/video content, and playing over OTT or MSO provided content received through the gateway device 2.

The connection 10 between the gateway device 2 and the client device 4 is implemented through a wireless connection that operates in accordance with, but is not limited to, any IEEE 802.11 protocols. Additionally, the connection 10 between the gateway device 2 and the client device 4 can also be implemented through a WAN, a LAN, a VPN, MANs, PANs, WLANs, SANs, a DOCSIS network, a fiber optics network (e.g., FTTH, FTTX, or HFC), a PSDN, a global Telex network, or a 2G, 3G, 4G or 5G network, for example. The connection 10 can also be implemented using a wireless connection in accordance with Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, or 6 GHz bands. One or more of the connections 10 can also be a wired Ethernet connection.

The connection 10 between the client device 4 and the gateway device 2 can be implemented using the 6 GHz radio 406 of the client device 4 and the 6 GHz radio 206 of the gateway device 2, for example. The connection 10 enables the gateway device 2 and the client device 4 to establish a 6 GHz wireless fronthaul (6 GHz FH) according to example embodiments of the present disclosure. However, the connection 10 could also be implemented using respective wired interfaces (e.g., Ethernet, cable, fiber optic, or the like) in some alternative example embodiments.

The connection 11 between the wireless extenders 3 and the client devices 4 is implemented through a wireless connection that operates in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, or 6 GHz bands. Additionally, the connection 11 can be implemented using a wireless connection that operates in accordance with, but is not limited to, RF4CE protocol, ZigBee protocol, Z-Wave protocol, or IEEE 802.15.4 protocol. Also, one or more of the connections 11 can be a wired Ethernet connection.

The connection 11 between the wireless extenders 3 and the client devices 4 can be implemented using the 2.4 GHz radio 404 or the 5 GHz radio 405 of the client devices 4 and the 2.4 GHz radio 304 or the 5 GHz radio 305 of the wireless extenders 3, for example. The connection 11 enables the wireless extenders 3 and the client devices 4 to establish a 2.4 GHz wireless fronthaul or a 5 GHz wireless fronthaul, according to example embodiments of the present disclosure. However, the connection 11 could also be implemented using respective wired interfaces (e.g., Ethernet, cable, fiber optic, or the like) in some alternative example embodiments.

Figure 2:
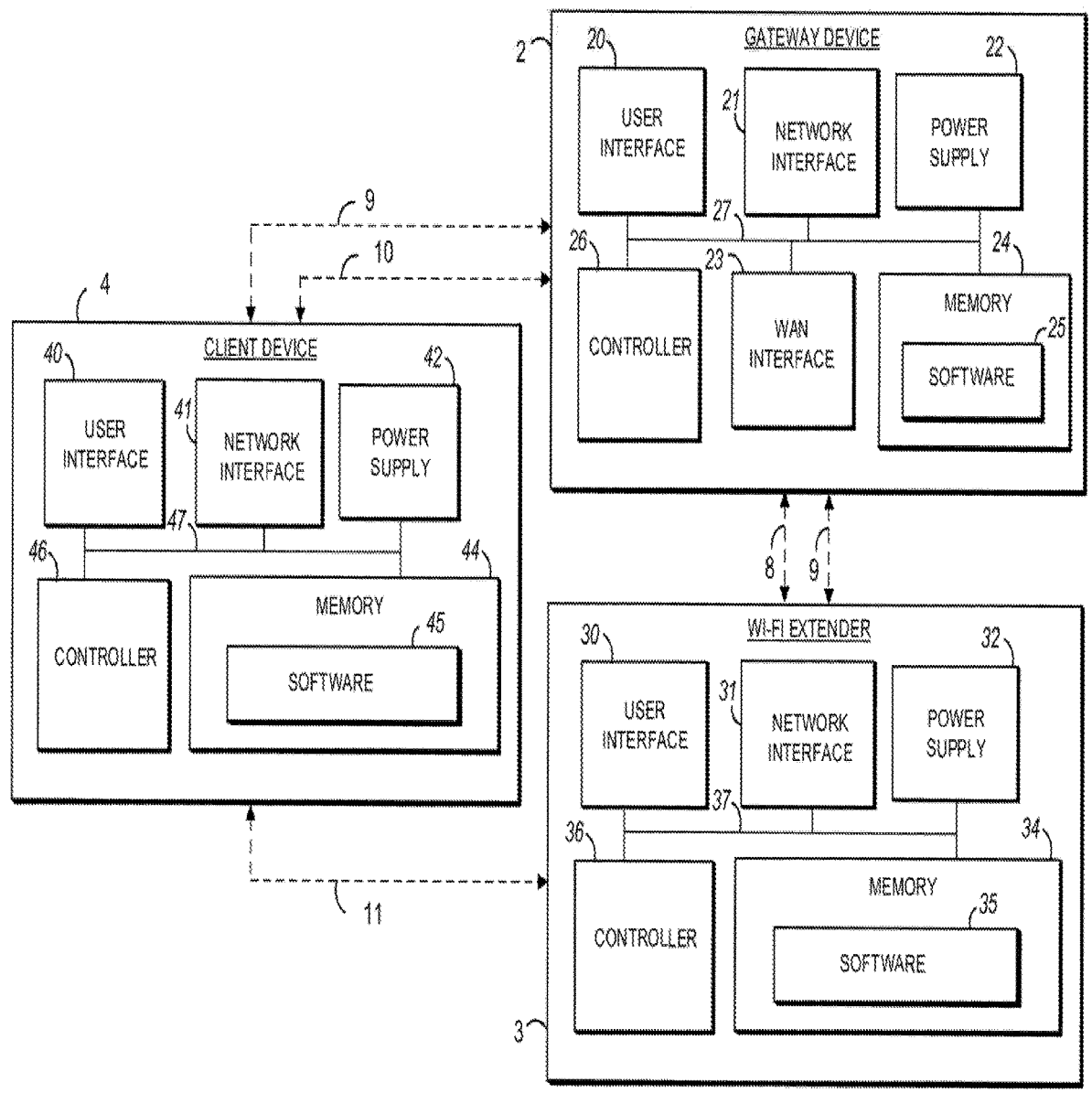
FIG. 2 is a more detailed block diagram illustrating various components of an exemplary gateway device, client device, and wireless extender implemented in the system of FIG. 1 according to an embodiment of the present disclosure.
Figure 3:
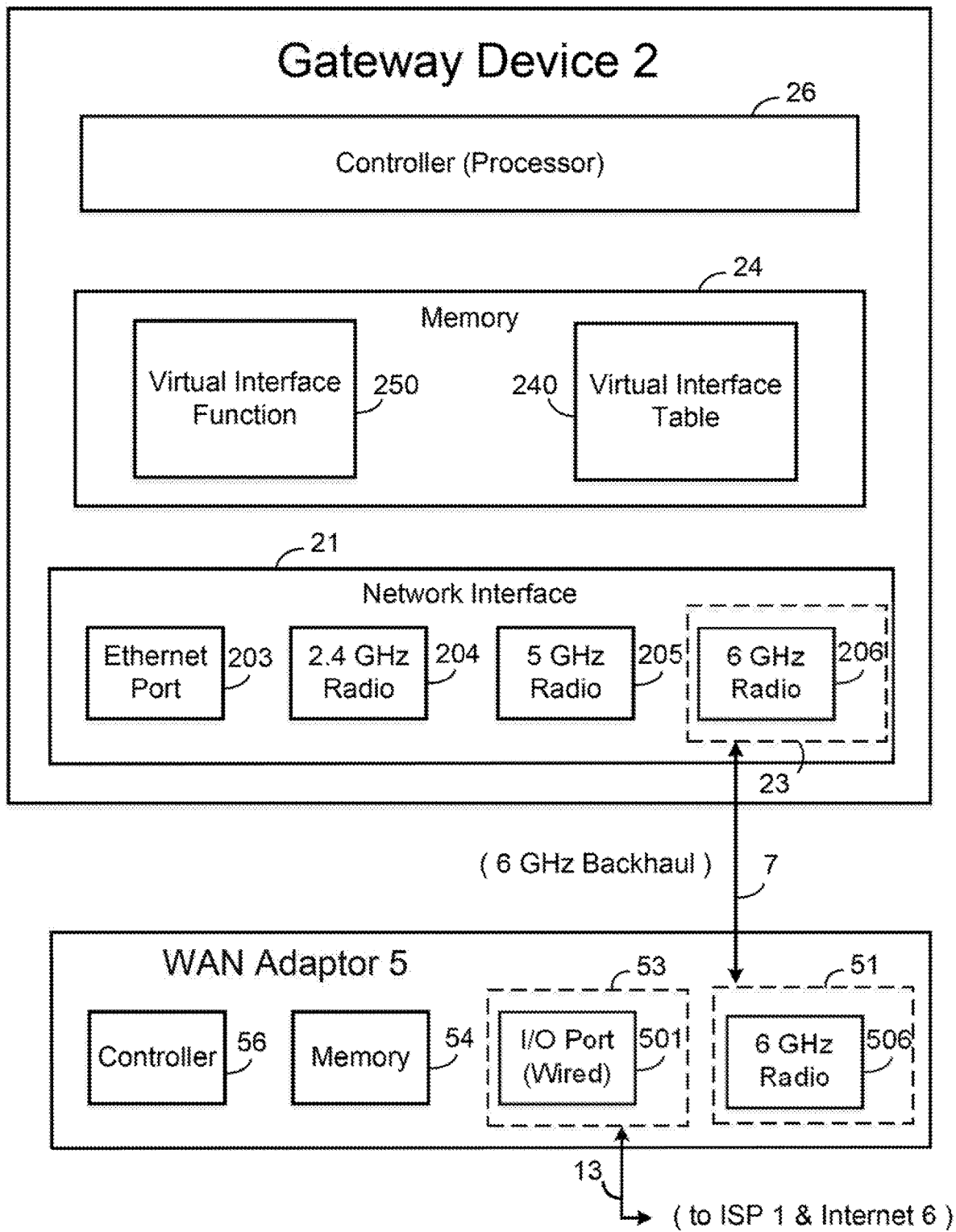
FIG. 3 is a more detailed block diagram illustrating certain components of an exemplary gateway device and an exemplary wide area network adaptor implemented in the system of FIG. 1 according to an embodiment of the present disclosure.

A more detailed description of the exemplary internal components of the gateway device 2, the wireless extenders 3, the client devices 4, and the WAN adaptor 5 shown in FIG. 1 will be provided in the discussion of FIGS. 2 and 3. However, in general, it is contemplated by the present disclosure that the gateway device 2, the wireless extenders 3, the client devices 4, and the WAN adaptor 5 include electronic components or electronic computing devices operable to receive, transmit, process, store, and/or manage data and information associated with the system, which encompasses any suitable processing device adapted to perform computing tasks consistent with the execution of computer-readable instructions stored in a memory or a computer-readable recording medium (e.g., a non-transitory computer-readable medium).

Further, any, all, or some of the computing components in the gateway device 2, the wireless extenders 3, the client devices 4, and the WAN adaptor 5 may be adapted to execute any operating system, including Linux, UNIX, Windows, MacOS, DOS, and ChromOS as well as virtual machines adapted to virtualize execution of a particular operating system, including customized and proprietary operating systems. The gateway device 2, the wireless extenders 3, the client devices 4, and the WAN adaptor 5 are further equipped with components to facilitate communication with other computing devices over the one or more network connections to local and wide area networks, wireless and wired networks, public and private networks, and any other communication network enabling communication in the system.

FIG. 2 is a more detailed block diagram illustrating various components of an exemplary gateway device, client device, and wireless extender implemented in the system of FIG. 1, according to an embodiment of the present disclosure.

Although FIG. 2 only shows one wireless extender 3 and one client device 4, the wireless extender 3 and the client device 4 shown in the figure are meant to be representative of the other wireless extenders 3 and client devices 4 shown in FIG. 1. Similarly, the connections 8, 9, 10, and 11 between the gateway device 2, the wireless extender 3, and the client device 4 shown in FIG. 2 are meant to be exemplary connections and are not meant to indicate all possible connections between the gateway devices 2, wireless extenders 3, and client devices 4. Additionally, it is contemplated by the present disclosure that the number of gateway devices 2, wireless extenders 3, and client devices 4 is not limited to the number of gateway devices 2, wireless extenders 3, and client devices 4 shown in FIGS. 1 and 2.

Now referring to FIG. 2 (e.g., from left to right), the client device 4 can be, for example, a computer, a portable device, an electronic tablet, an e-reader, a PDA, a smart phone, a smart speaker, an IoT device, an iControl device, portable music player with smart capabilities capable of connecting to the Internet, cellular networks, and interconnecting with other devices via Wi-Fi and Bluetooth, or other wireless hand-held consumer electronic device capable of executing and displaying the content received through the gateway device 2. Additionally, the client device 4 can be a TV, an IP/QAM STB, or an SMD that is capable of decoding audio/video content, and playing over OTT or MSO provided content received through the gateway device 2.

As shown in FIG. 2, the client device 4 includes a user interface 40, a network interface 41, a power supply 42, a memory 44, and a controller 46.

The user interface 40 includes, but is not limited to, push buttons, a keyboard, a keypad, a liquid crystal display (LCD), a thin film transistor (TFT), a light-emitting diode (LED), a high definition (HD) or other similar display device including a display device having touch screen capabilities so as to allow interaction between a user and the client device 4.

The network interface 41 can include, but is not limited to, various network cards, interfaces, and circuitry implemented in software and/or hardware to enable communications with the gateway device 2 and the wireless extender 3 using the communication protocols in accordance with connections 9, 10, and/or 11 (e.g., as described with reference to FIG. 1).

For example, the network interface 41 can include multiple radios (e.g., a 2.4 GHz radio, one or more 5 GHz radios, and/or a 6 GHz radio), which may also be referred to as wireless local area network (WLAN) interfaces. The radios (e.g., 2.4 GHz, 5 GHz, and/or 6 GHz radio(s)) provide a fronthaul (FH) connection between the client device(s) 4 and the gateway device 2 and/or the wireless extender 3.

The power supply 42 supplies power to the internal components of the client device 4 through the internal bus 47. The power supply 42 can be a self-contained power source such as a battery pack with an interface to be powered through an electrical charger connected to an outlet (e.g., either directly or by way of another device). The power supply 42 can also include a rechargeable battery that can be detached allowing for replacement such as a nickel-cadmium (NiCd), nickel metal hydride (NiMH), a lithium-ion (Li-ion), or a lithium Polymer (Li-pol) battery.

The memory 44 includes a single memory or one or more memories or memory locations that include, but are not limited to, a random access memory (RAM), a dynamic random access memory (DRAM) a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), a hard disk or any other various layers of memory hierarchy. The memory 44 can be used to store any type of instructions, software, or algorithms including software 45 for controlling the general function and operations of the client device 4 in accordance with the embodiments described in the present disclosure.

The controller 46 controls the general operations of the client device 4 and includes, but is not limited to, a central processing unit (CPU), a hardware microprocessor, a hardware processor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software including the software 45 for controlling the operation and functions of the client device 4 in accordance with the embodiments described in the present disclosure. Communication between the components (e.g., 40, 41, 42, 44, 46) of the client device 4 may be established using an internal bus 47.

The wireless extender 3 can be, for example, a hardware electronic device such as an access point (AP) used to extend a wireless network by receiving the signals transmitted by the gateway device 2 and rebroadcasting the signals to client devices 4, which may be out of range of the gateway device 2. The wireless extender 3 can also receive signals from the client devices 4 and rebroadcast the signals to the gateway device 2, mobile device 5, or other client devices 4.

As shown in FIG. 2, the wireless extender 3 includes a user interface 30, a network interface 31, a power supply 32, a memory 34, and a controller 36.

The user interface 30 can include, but is not limited to, push buttons, a keyboard, a keypad, an LCD, a TFT, an LED, an HD or other similar display device including a display device having touch screen capabilities so as to allow interaction between a user and the wireless extender 3.

The network interface 31 can include various network cards, interfaces, and circuitry implemented in software and/or hardware to enable communications with the client device 4 and the gateway device 2 using the communication protocols in accordance with connections 8, 9, and/or 11 (e.g., as described with reference to FIG. 1). For example, the network interface 31 can include multiple radios or sets of radios (e.g., a 2.4 GHz radio, one or more 5 GHz radios, and/or a 6 GHz radio), which may also be referred to as wireless local area network (WLAN) interfaces. One radio or set of radios (e.g., 5 GHz and/or 6 GHz radio(s)) provides a backhaul (BH) connection between the wireless extender 3 and the gateway device 2, and optionally other wireless extender(s) 3. Another radio or set of radios (e.g., 2.4 GHz, 5 GHz, and/or 6 GHz radio(s)) provides a fronthaul (FH) connection between the wireless extender 3 and one or more client device(s) 4.

The power supply 32 supplies power to the internal components of the wireless extender 3 through the internal bus 37. The power supply 32 can be connected to an electrical outlet (e.g., either directly or by way of another device) via a cable or wire.

The memory 34 can include a single memory or one or more memories or memory locations that include, but are not limited to, a RAM, a DRAM, a memory buffer, a hard drive, a database, an EPROM, an EEPROM, a ROM, a flash memory, logic blocks of an FPGA, hard disk or any other various layers of memory hierarchy. The memory 34 can be used to store any type of instructions, software, or algorithm including software 35 associated with controlling the general functions and operations of the wireless extender 3 in accordance with the embodiments described in the present disclosure.

The controller 36 controls the general operations of the wireless extender 3 and can include, but is not limited to, a CPU, a hardware microprocessor, a hardware processor, a multi-core processor, a single core processor, an FPGA, a microcontroller, an ASIC, a DSP, or other similar processing device capable of executing any type of instructions, algorithms, or software including the software 35 for controlling the operation and functions of the wireless extender 3 in accordance with the embodiments described in the present disclosure. General communication between the components (e.g., 30, 31, 32, 34, 36) of the wireless extender 3 may be established using the internal bus 37.

The gateway device 2 can be, for example, a hardware electronic device that can combine the functions of a modem, an access point (AP), and/or a router for providing content received from the content provider (ISP) 1 to network devices (e.g., wireless extenders 3, client devices 4) in the system. It is also contemplated by the present disclosure that the gateway device 2 can include the function of, but is not limited to, an IP/QAM STB or SMD that is capable of decoding audio/video content, and playing OTT or MSO provided content.

As shown in FIG. 2, the gateway device 2 includes a user interface 20, a network interface 21, a power supply 22, a wide area network (WAN) interface 23, a memory 24, and a controller 26.

The user interface 20 can include, but is not limited to, push buttons, a keyboard, a keypad, an LCD, a TFT, an LED, an HD or other similar display device including a display device having touch screen capabilities so as to allow interaction between a user and the gateway device 2.

The network interface 21 may include various network cards, and circuitry implemented in software and/or hardware to enable communications with the wireless extender 3 and the client device 4 using the communication protocols in accordance with connections 8, 9, 10, and/or 11 (e.g., as described with reference to FIG. 1). For example, the network interface 21 can include an Ethernet port (also referred to as a LAN interface) and multiple radios or sets of radios (e.g., a 2.4 GHz radio, one or more 5 GHz radios, and/or a 6 GHz radio, also referred to as WLAN interfaces). One radio or set of radios (e.g., 5 GHz and/or 6 GHz radio(s)) can provide a wireless backhaul (BH) connection between the gateway device 2 and the wireless extender(s) 3. Another radio or set of radios (e.g., 2.4 GHz, 5 GHz, and/or 6 GHz radio(s)) can provide a fronthaul (FH) connection between the gateway device 2 and one or more client device(s) 4.

The power supply 22 supplies power to the internal components of the gateway device 2 through the internal bus 27. The power supply 22 can be connected to an electrical outlet (e.g., either directly or by way of another device) via a cable or wire.

The WAN interface 23 may include various network cards, and circuitry implemented in software and/or hardware to enable communications between the gateway device 2 and the Internet 6, via the ISP 1 and the WAN adaptor 5, using the wired and/or wireless protocols in accordance with connection 7 (e.g., as described with reference to FIG. 1). For example, the WAN interface 23 can include an Ethernet port and one or more radios (e.g., a 6 GHz radio). The WAN interface 23 (e.g., 6 GHz radio) may be used to provide a wireless backhaul (BH) connection between the gateway device 2 and the WAN adaptor 5 (e.g., as described with reference to FIG. 1, and further described with reference to FIG. 3 below), according to example embodiments of the present disclosure. However, the WAN interface 23 could provide a wired Ethernet connection (e.g., a BH connection) between the gateway device 2 and the WAN adaptor 5 according to some alternative example embodiments.

The memory 24 includes a single memory or one or more memories or memory locations that include, but are not limited to, a RAM, a DRAM, a memory buffer, a hard drive, a database, an EPROM, an EEPROM, a ROM, a flash memory, logic blocks of a FPGA, hard disk or any other various layers of memory hierarchy. The memory 24 can be used to store any type of instructions, software, or algorithm including software 25 for controlling the general functions and operations of the gateway device 2 and performing management functions related to the other devices (e.g., wireless extenders 3 and client devices 4) in the network in accordance with the embodiments described in the present disclosure (e.g., including a virtual interface function according to some example embodiments of the present disclosure).

The controller 26 controls the general operations of the gateway device 2 as well as performs management functions related to the other devices (e.g., wireless extenders 3 and client device 4) in the network. The controller 26 can include, but is not limited to, a central processing unit (CPU), a hardware microprocessor, a hardware processor, a multi-core processor, a single core processor, a FPGA, a microcontroller, an ASIC, a DSP, or other similar processing device capable of executing any type of instructions, algorithms, or software including the software 25 for controlling the operation and functions of the gateway device 2 in accordance with the embodiments described in the present disclosure. Communication between the components (e.g., 20, 21, 22, 23, 24, 26) of the gateway device 2 may be established using the internal bus 27. The controller 26 may also be referred to as a processor, generally.

FIG. 3 is a more detailed block diagram illustrating certain components of an exemplary gateway device and an exemplary wide area network adaptor implemented in the system of FIG. 1, according to an embodiment of the present disclosure.

As shown in FIG. 3, the gateway device 2 includes the network interface 21, the WAN interface 23, the memory 24, and the controller (processor) 26.

The network interface 21 includes an Ethernet port 203 (e.g., a wired LAN interface), a 2.4 GHz radio 204, a 5 GHz radio 205, and a 6 GHz radio 206 (e.g., wireless LAN interfaces, or WLAN interfaces). The gateway device 2 may communicate with the local area network devices (e.g., the wireless extenders 3, the client devices 4) of the system via one or more of the Ethernet port 203, the 2.4 GHz radio 204, the 5 GHz radio 205, and/or the 6 GHz radio 206. The gateway device 2 may communicate with the wide area network devices (e.g., the WAN adaptor 5) via the 6 GHz radio 206. As mentioned above, according to aspects of the present disclosure, one radio or set of radios can provide a backhaul (BH) connection between the gateway device 2, the wireless extender(s) 3 and the WAN adaptor 5, while another radio or set of radios can provide a fronthaul (FH) connection between the gateway device 2 and the client device(s) 4. However, the gateway device 2 may communicate with the LAN devices (e.g., the wireless extenders 3, the client devices 4) and/or the WAN devices (e.g., the WAN adaptor 5) via a wired Ethernet port according to some alternative example embodiments.

The memory 24 includes a virtual interface function 250 and a virtual interface table 240. The virtual interface function 250 may be implemented as part of the instructions, algorithms, or software including the software 25 described above with reference to FIG. 2. The virtual interface table 300 may be a data structure storing various pieces of data, such as service set identifiers (e.g., WAN SSID and LAN SSID) and/or virtual tags (e.g., vWAN tag and vLAN tag) for use when performing operations in accordance with embodiments described in the present disclosure (e.g., including the virtual interface function according to some example embodiments).

The controller 26 includes a processor that is configured to access the memory 24, perform the virtual interface function 250 (e.g., via execution of the software 25), and make determinations based on the information in virtual interface table 240. The controller 26 also controls communications with the network devices (e.g., the wireless extenders 3, the client devices 4, and the WAN adaptor 5) via the Ethernet port 203, the 2.4 GHz radio 204, the 5 GHz radio 205, and/or the 6 GHz radio 206 in accordance with embodiments described in the present disclosure.

As shown in FIG. 3, the WAN adaptor 5 includes the network interface 51, the WAN interface 53, the memory 54, and the controller 56.

The network interface 51 may include various network cards, and circuitry implemented in software and/or hardware to enable communications with the gateway device 2 using the communication protocols in accordance with connection 7 (e.g., as described with reference to FIG. 1). For example, the network interface 51 can include a 6 GHz radio 506. The WAN adaptor 5 may communicate with the gateway device 2 via the 6 GHz radio 506. As mentioned above, according to aspects of the present disclosure, the 6 GHz radio 506 can provide a 6 GHz wireless backhaul (BH) connection between the WAN adaptor 5 and the gateway device 2. However, the WAN adaptor 5 may communicate with the gateway device 2 via a wired Ethernet port according to some alternative example embodiments.

The WAN interface 53 may include various network cards, and circuitry implemented in software and/or hardware to enable communications between the WAN adaptor 5 and the Internet 6 via the ISP 1 using the communication protocols in accordance with connection 13 (e.g., as described with reference to FIG. 1). For example, the WAN interface 53 can include an I/O port 501, which may provide a wired connection (e.g., Ethernet, cable, fiber, or the like) between the WAN adaptor 5 and the ISP 1 (e.g., via the ONT 16 as described with reference to FIG. 1). The WAN adaptor 5 may also communicate with the file server 12 of the ISP 1 via the WAN interface 53 (e.g., the wired connection of the I/O port 501).

The memory 54 includes a single memory or one or more memories or memory locations that include, but are not limited to, a RAM, a DRAM, a memory buffer, a hard drive, a database, an EPROM, an EEPROM, a ROM, a flash memory, logic blocks of a FPGA, hard disk or any other various layers of memory hierarchy. The memory 54 can be used to store any type of instructions, software, or algorithm for controlling the general functions and operations of the WAN adaptor 5 in accordance with the embodiments described in the present disclosure.

The controller 56 includes a processor that is configured to access the memory 54 and control the general operations of the WAN adaptor 5. The controller 56 can include, but is not limited to, a central processing unit (CPU), a hardware microprocessor, a hardware processor, a multi-core processor, a single core processor, a FPGA, a microcontroller, an ASIC, a DSP, or other similar processing device capable of executing any type of instructions, algorithms, or software for controlling the operation and functions of the WAN adaptor 5 in accordance with the embodiments described in the present disclosure. The controller 56 also controls communications with the gateway device 2 via the network interface 51 (e.g., the 6 GHz radio 506) and with the ISP 1 via the WAN interface 53 (e.g., the I/O port 501) in accordance with embodiments described in the present disclosure.

Figure 4:
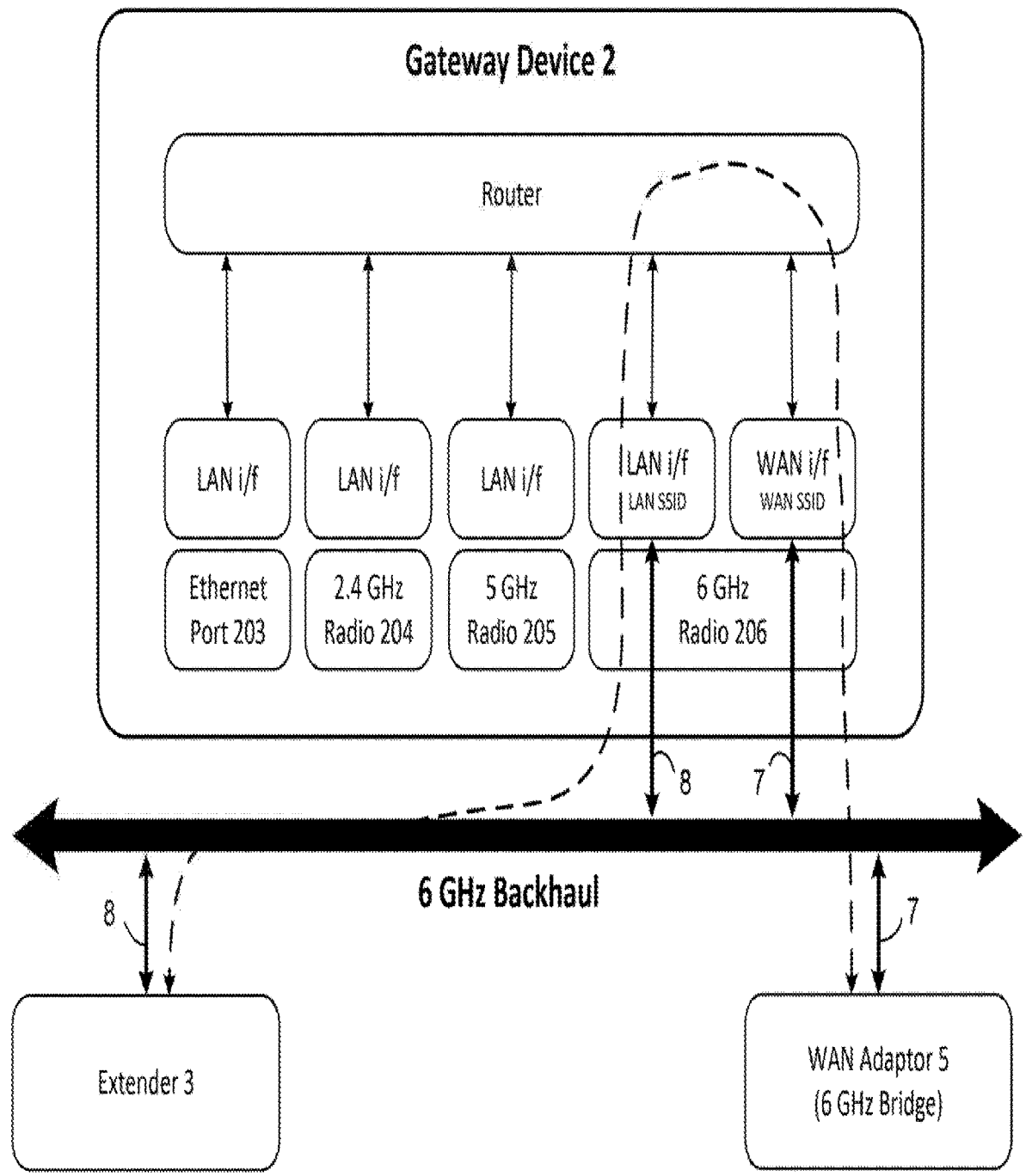
FIG. 4 is a diagram illustrating an example of a 6 GHz Backhaul connection of a gateway device with a wireless extender and a WAN adaptor, according to some example embodiments of the present disclosure.

FIG. 4 is a diagram of a 6 GHz Backhaul connection of a gateway device with a wireless extender and a WAN adaptor, according to an embodiment of the present disclosure.

Referring to FIG. 4, the 6 GHz Backhaul connection enables traffic to be communicated between a WAN (e.g., the Internet) and a LAN, or vice versa. The traffic between the WAN and the LAN goes through a router component of the gateway device 2. The gateway device 2, which may also be referred to as a residential gateway (RG), broadband access device, or access point (AP), is an electronic apparatus that may be configured for various forms of network connectivity, including but not limited to Ethernet (wired) and one or more Wi-Fi radios (wireless). For example, the gateway device 2 may include a 2.4 GHz radio, a 5 GHz radio, and a 6 GHz radio. Each of the Ethernet, 2.4 GHz radio, and 5 GHz radio may communicate with the router via a respective LAN interface. However, the 6 GHz radio may communicate with the router via either of a LAN interface and/or a WAN interface according to some example embodiments. Instead of having two separate 6 GHz radios (one for the LAN side and one for the WAN side), the solution according to example embodiments of the present disclosure involves configuring the gateway device 2 to implement two virtual interfaces (or logical interfaces) over a single physical interface, such as a 6 GHz Wi-Fi radio, during an initial setup process. The virtual LAN interface can be associated with a first SSID (LAN SSID) and the virtual WAN interface can be associated with a second SSID (WAN SSID), as will be discussed in detail below in connection with example embodiments of the present disclosure. Thus, the gateway device 2 may include a single physical interface, such as the 6 GHz radio 206, that is "virtualized" so as to provide both a LAN interface and a WAN interface.

As shown in FIG. 4, the gateway device 2 may include multiple physical interfaces, such as an Ethernet port 203, a 2.4 GHz radio 204, a 5 GHz radio 205, and a 6 GHz radio 206, for example. The gateway device 2 may also include a router component that provides a packet forward processing function for directing communications with other network devices. The Ethernet port 203 may be configured to provide a first LAN interface with the router of the gateway device 2, and may provide wired connectivity to the network devices (such as the wireless extenders 3 and/or the client devices 4). The 2.4 GHz radio 204 and the 5 GHz radio 205 may be configured to provide a second LAN interface and a third LAN interface with the router of the gateway device 2, respectively, and may provide wireless connectivity to network devices (e.g., client devices 4) that are configured to operate in the 2.4 GHz and/or 5 GHz bands. The 2.4 GHz Wi-Fi radio and the 5 GHz Wi-Fi radio may be single-band antennas in some example embodiments. However, some other example embodiments are not limited thereto, and the Wi-Fi radios may be dual-band antennas (e.g., supporting both 2.4 GHz and 5 GHz bands, at different times and/or at the same time) or tri-band antennas (e.g., supporting a single 2.4 GHz band and two 5 GHz bands, such as a low band and a high band).

According to example embodiments of the present disclosure, the 6 GHz radio 206 may be configured to provide both a fourth LAN interface and a wide area network (WAN) interface with the router of the gateway device 2, and provide wireless connectivity to network devices (e.g., wireless extenders 3 and/or client devices 4) that are configured to operate in the 6 GHz band (also referred to as 'Wi-Fi 6E' devices). The fourth LAN interface and the WAN interface may be configured as virtual interfaces provided over a single physical connection (e.g., the 6 GHz radio 206). The virtual interfaces may also be referred to as logical interfaces. A virtual LAN interface and a virtual WAN interface may be distinguished from each other by using different service set identifiers or SSIDs (e.g., 6G-LAN and 6G-WAN, Wi-Fi 6E LAN and Wi-Fi 6E WAN, NetworkName-LAN-6 GHz and NetworkName-WAN-6 GHz, etc.), according to example embodiments of the present disclosure. Each SSID is configured to connect to either the WAN side of the gateway device 2 or the LAN side of the gateway device 2. In contrast to the gateway device 2 according to example embodiments of the present disclosure, the Wi-Fi radio in currently existing RGs, GWs, and APs is always serving the LAN side only (not the WAN side). Thus, the SSID is implicitly associated with the LAN side of the known RG, GW, or AP. That is, the related art includes a LAN SSID only, whereas the gateway device 2 according to example embodiments of the present disclosure also provides a WAN SSID for the WAN side of the gateway device 2 in order to enable certain aspects of inventive concepts disclosed herein. Additionally or alternatively, LAN side traffic and WAN side traffic associated with a respective virtual interface may be distinguished from each other using a virtual tagging technique, similar to some virtual LAN (VLAN) technologies. Details of the configuration to provide both a virtual LAN interface and a virtual WAN interface over a single physical 6 GHz Wi-Fi radio will be discussed further below in connection with FIG. 5.

As shown in FIG. 4, the 6 GHz Backhaul connects the gateway device 2 with the wireless extender 3 and the WAN adaptor 5 as a result of an initial setup process. The wireless extenders 3 are Wi-Fi clients that are configured to discover and associate to the LAN SSID and acquire an IP address from the gateway device 2. The gateway device 2 can acquire the IP address for the wireless extenders 3 from the network (e.g., via a DHCP server) according to known techniques, for example. The WAN adaptor 5 is also a Wi-Fi client that is configured to discover and associate to the WAN SSID, and serve as an intermediary (e.g., a "6 GHz to Ethernet Bridge") between the LAN and the WAN. The WAN adaptor 5 may have a well-known, fixed IP address for management. Upon association with the wireless extender 3 and/or the WAN adaptor 5, a "link up" event occurs at the gateway device 2. The gateway device 2 can thus configure the wireless extenders 3 to communicate with the gateway device 2 using the LAN SSID and configure the WAN adaptor 5 to communicate with the gateway device 2 using the WAN SSID. The gateway device 2 and the WAN adaptor 5 may communicate with each other via the connection 7 (e.g., described with reference to FIG. 1), and the gateway device 2 and the wireless extenders 3 may communicate with each other via the connection 8 (e.g., described with reference to FIG. 1).

Figure 5:
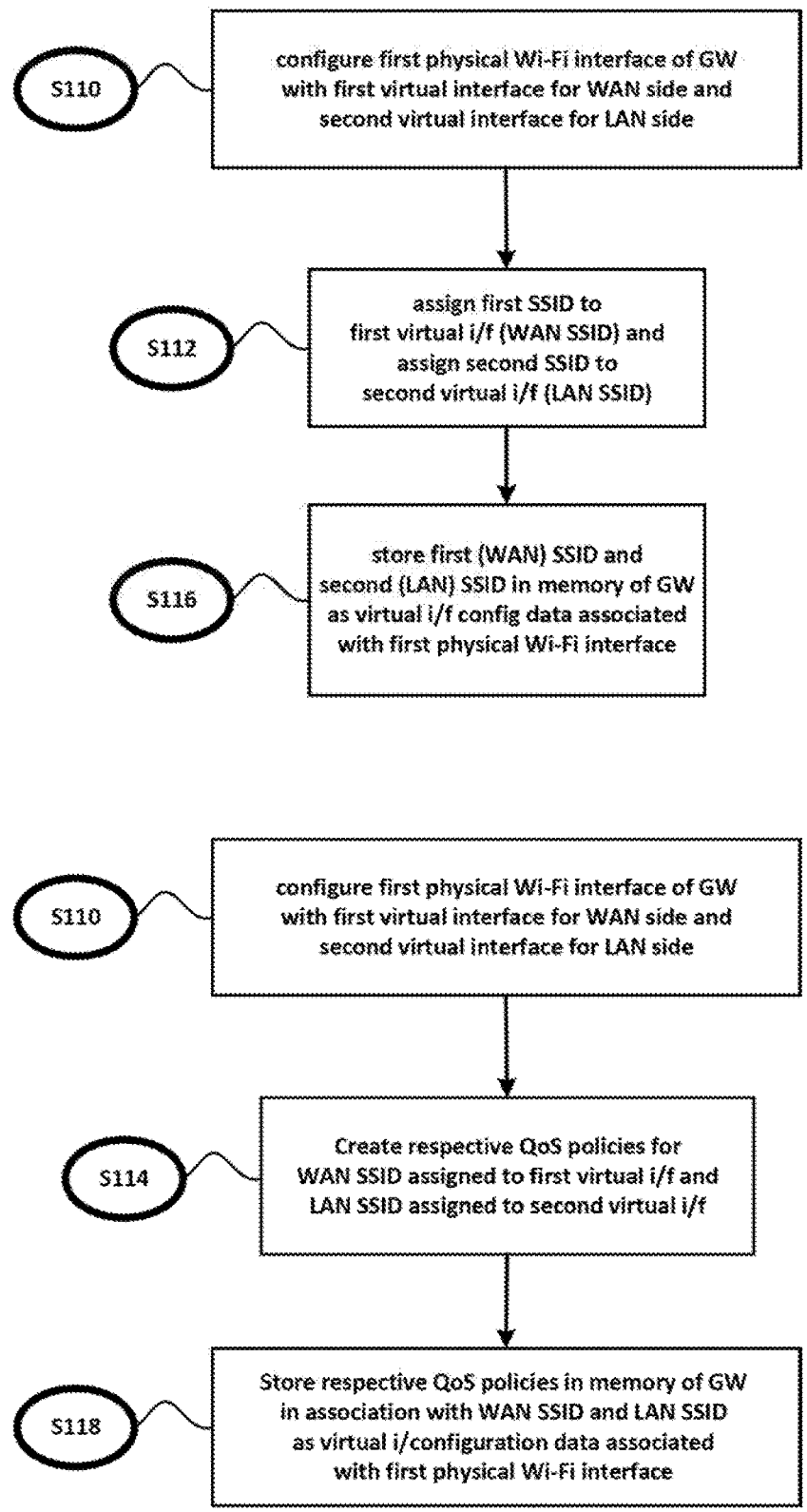
FIG. 5 is a flow chart illustrating details of a configuration phase of a method for providing multiple virtual interfaces over a single physical interface, according to an embodiment of the present disclosure.

FIG. 5 is a flow chart illustrating details of a configuration phase of a method for providing multiple virtual interfaces over a single physical interface, according to an embodiment of the present disclosure.

Referring to FIG. 5, the gateway device 2 may include one or more computer processors and one or more memories storing various firmware, software, programs, instructions and/or combinations thereof, which together enable the gateway device 2 to perform a method to create two virtual interfaces (or logical interfaces) in association with a single physical interface, such as a 6 GHz Wi-Fi radio, for example. One logical interface (e.g., a first virtual interface) can be attached to the WAN side of the gateway device 2, and the other logical interface (e.g., a second virtual interface) can be connected to the LAN side of the gateway device 2. This solution amounts to a technical improvement over the currently existing implementations that require two separate physical interfaces for the WAN traffic and the LAN traffic, respectively.

As shown in FIG. 5, according to some example embodiments of the present disclosure, a method for providing multiple virtual interfaces over a single physical interface involves creating two separate service set identifiers (SSIDs), namely, one SSID for the Local Area Network (e.g., LAN SSID) side of the gateway device 2, and another SSID for the Wide Area Network (e.g., WAN SSID) side of the gateway device 2. A key aspect of the solution is that the WAN side traffic can be distinguished and separated from the LAN side traffic (or vice versa) by the gateway device 2, even as both sets of traffic flows are being transmitted through a single physical interface (e.g., the 6 GHz radio 206).

At step S110, the gateway device 2 configures a first physical Wi-Fi interface (e.g., the 6 GHz radio 206) of the gateway device 2 with a first virtual interface for the WAN side and a second virtual interface for the LAN side.

In some example embodiments, the gateway device 2 performs the configuration by assigning a first SSID (WAN SSID) to the first virtual interface and assigning a second SSID (LAN SSID) to the second virtual interface at step S112, and storing the first SSID (WAN SSID) and the second SSID (LAN SSID) in a memory of the gateway device 2, as virtual interface configuration data associated with the first physical Wi-Fi interface (e.g., the 6 GHz radio 206) of the gateway device 2, at step S116.

In some example embodiments, the gateway device 2 also performs the configuration of step S110 by configuring a respective QoS policy for each SSID. For example, the gateway device 2 may create a first QoS policy for the first SSID (WAN SSID) assigned to the first virtual interface and create a second QoS policy for the second SSID (LAN SSID) assigned to the second virtual interface at step S114, and store the first QoS policy and the second QoS policy in the memory of the gateway device 2 in association with the first SSID (WAN SSID) and the second SSID (LAN SSID), respectively, as the virtual interface configuration data associated with the first physical Wi-Fi interface (e.g., the 6 GHz radio 206) of the gateway device 2, at step S118.

As mentioned above, the term virtual interface configuration data refers to information that can be used by the gateway device 2 to configure the multiple virtual interfaces in association with the 6 GHz physical interface. The virtual interface configuration data may be stored in a non-volatile memory of the gateway device 2, similar to other configuration data maintained on the gateway device 2. For example, the virtual interface configuration data may be stored in the virtual interface table 240 in the memory 24 of the gateway device 2 (e.g., as described above with reference to FIG. 3). The following is a simple example of interface configuration data, including the virtual interface configuration data:

Phy_Interface[0]=6 GHz radio
Phy_Interface[0].virt_interface[0].SSID[0]="6G-WAN"
Phy_Interface[0].virt_interface[0].SSID[0].
  password="6G-WAN-password"
Phy_Interface[0].virt_interface[0].SSID[0].bandwidth="35%"
Phy_Interface[0].virt_interface[1].SSID[1]="6G-LAN"
Phy_Interface[0].virt_interface[1].SSID[1]
  .password="6G-LAN-password"
Phy_Interface[0].virt_interface[1].SSID[1].bandwidth="65%"

With the above configuration, 35% of the 6 GHz bandwidth may be allocated to (or reserved for) the WAN side of the gateway device 2, while 65% of the 6 GHz bandwidth may be allocated (or reserved for) the LAN side of the gateway device 2. However, it should be appreciated that this example is merely intended to be illustrative only and should not be construed as limiting any example embodiments of the present disclosure.

The respective QoS policies may serve to allow the gateway device 2 to allocate available bandwidth (e.g., in the 6 GHz radio frequency band) in various ways, according to example embodiments of the present disclosure. For example, a QoS policy may relate to allocating a first portion of available 6 GHz bandwidth to the WAN SSID associated with the first virtual interface and allocating a second portion of available 6 GHz bandwidth to the LAN SSID associated with the second virtual interface for the LAN side (e.g., 50% bandwidth portion to each of the WAN side and the LAN side of the gateway device 2). In a further modification of this example, the QoS policy may relate to allocating one or more sub-portions of the second portion of the available 6 GHz bandwidth to one or more client devices connected to the second virtual interface for the LAN side (e.g., allocate 25% of the 50% bandwidth portion allocated to the LAN side to an extender 3). In other examples, the QoS policy may relate to assigning a priority among different services (e.g., voice, video, data) and/or client devices (e.g., security devices, extender devices 1, 2, etc., all other devices) over each of the first virtual interface for the WAN side and the second virtual interface for the LAN side.

Figure 6:
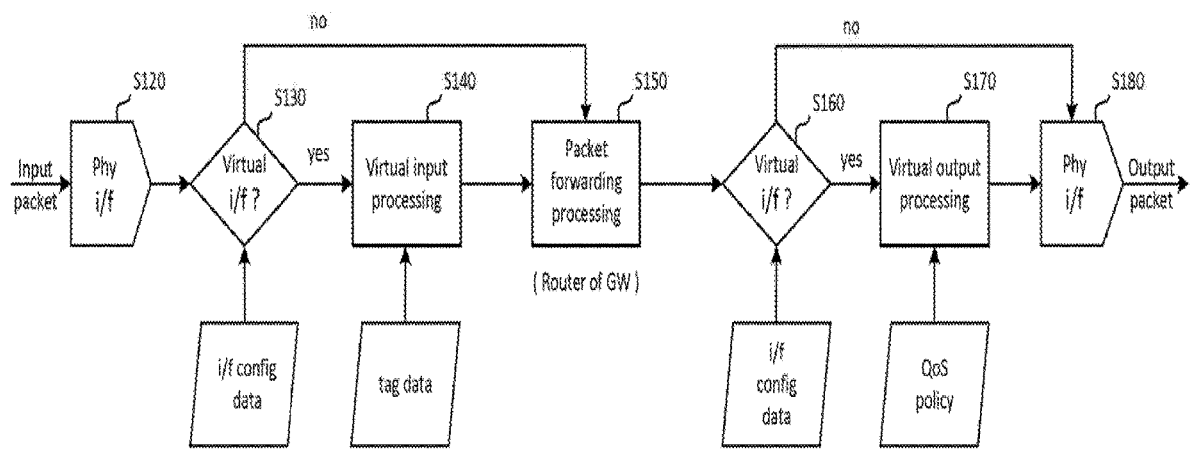
FIG. 6 is a diagram illustrating a flow of a packet through a gateway device during an input/output phase of a method for providing multiple virtual interfaces over a single physical interface, according to an embodiment of the present disclosure.

FIG. 6 is a block diagram illustrating a flow of a packet through a gateway device 2 during an input/output phase of a method for providing multiple virtual interfaces over a single physical interface, according to an embodiment of the present disclosure.

The input/output phase of the method may occur after the configuration phase of the method described above with reference to FIG. 5. As shown in FIG. 6, a packet (input packet) may be received at a physical interface of the gateway device 2, at step S120. The gateway device 2 may determine whether the packet was received over a virtual interface associated with a first physical interface (e.g., 6 GHz radio 206) of the gateway device 2, or received over another physical interface (e.g., the Ethernet port 203, the 2.4 GHz radio 204, or the 5 GHz radio 205) of the gateway device 2, at step S130. The determination may be based on interface configuration data, for example. According to example embodiments of the present disclosure, the interface configuration data may include virtual interface configuration data associated with the 6 GHz radio 206. The virtual interface configuration data may be stored in the virtual interface table 240 in the memory 24 of the gateway device 2, for example. If the interface configuration data indicates that the packet was received over a virtual interface ("yes" at S130), the gateway device 2 may perform virtual input processing for the packet, at step S140. The virtual input processing may be configured to manage the packet flow to the router of the gateway device 2 (e.g., for packet forwarding processing) based on the input packet being received over a virtual interface. In some example embodiments, the virtual input processing function may include tagging the packet as coming from a virtual interface so that when the packet is output from the router component of the gateway device 2 (e.g., upon performing the packet forwarding processing function), the packet can be forwarded for virtual output processing of the WAN traffic or the LAN traffic based on the tagging. For example, the gateway device 2 may tag the input packet with the WAN SSID (and/or a vWAN tag) for WAN traffic or with the LAN SSID (and/or a vLAN tag) for LAN traffic. The virtual input processing function of the gateway device 2 may be implemented by the processor of the gateway device 2 via Wi-Fi firmware and/or software routines, for example. However, if the interface configuration data indicates that the packet was received over another physical interface (e.g., Ethernet port, 2.4 GHz radio, 5 GHz radio) ("no" at S130), the packet may bypass the virtual input processing and be provided to the router directly.

Upon receiving the input packet, the router component of the gateway device 2 can perform packet forwarding processing according to known techniques, at step S150. For example, the router may perform NAT translation, firewall functions, etc. Further details of the router function are not described herein for the sake of brevity. Then, the packet may be output by the router of the gateway device 2 according to the packet forwarding processing function.

The gateway device 2 may determine whether the packet (output packet) that is output as a result of the packet forwarding processing is to be transmitted over a virtual interface associated with the 6 GHz radio 206, or transmitted over another physical interface (e.g., the Ethernet port 203, the 2.4 GHz radio 204, or the 5 GHz radio 205), at step S160. The determination may be based on the interface configuration data, for example. As mentioned above, the interface configuration data may include virtual interface configuration data associated with the 6 GHz radio 206, according to example embodiments of the present disclosure. The virtual interface configuration data may be stored in the virtual interface table 240 in the memory 24 of the gateway device 2, for example. If the interface configuration data indicates that the packet is to be transmitted over a virtual interface ("yes" at S160), the gateway device 2 may perform virtual output processing for the packet, at step S170. The virtual output processing may be configured to manage the packet flow to each virtual interface of the gateway device 2 (e.g., associated with the 6 GHz radio 206) in accordance with a quality of service (QoS) policy. The virtual output processing function of the gateway device 2 may be implemented by the processor of the gateway device 2 via Wi-Fi firmware and/or software routines, for example. However, if the interface configuration data indicates that the packet is to be transmitted over another physical interface (e.g., Ethernet port, 2.4 GHz radio, 5 GHz radio) ("no" at S160), the packet may bypass the virtual output processing and be provided to the other physical interface directly. Finally, the packet may be output at the corresponding physical interface of the gateway device 2, at step S180. For example, the packet will be output at the 6 GHz radio 206 in the case of the output packet being associated with one of the virtual interfaces, otherwise the packet will be output at the other physical interface (e.g., the Ethernet port 203, the 2.4 GHz radio 204, or the 5 GHz radio 205).

Figure 7:
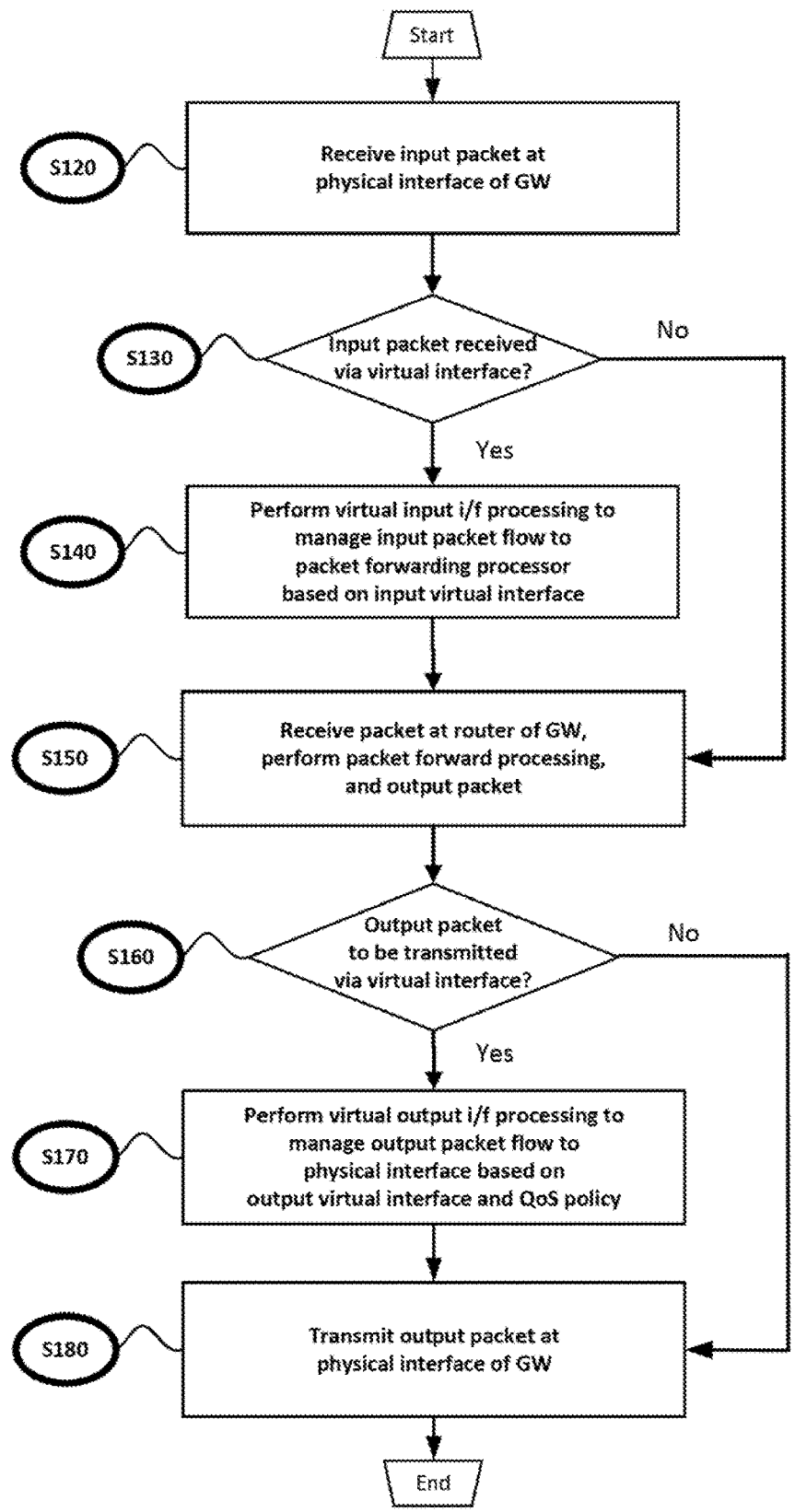
FIG. 7 is a flow chart illustrating details of a packet input/output phase of a method for providing multiple virtual interfaces over a single physical interface, according to an embodiment of the present disclosure.

FIG. 7 is a flow chart illustrating details of a packet input/output phase of a method for providing multiple virtual interfaces over a single physical interface, according to an embodiment of the present disclosure.

As mentioned above with reference to FIG. 6, the input/output phase of the method may occur after the configuration phase of the method described above with reference to FIG. 5. Referring to FIG. 7, the method includes receiving an input packet at a physical interface of the gateway device 2, at step S120. For example, the input packet may be received at the 6 GHz radio 206 of the gateway device 2. Alternatively, the input packet may be received at another physical interface (e.g., the Ethernet port 203, the 2.4 GHz radio 204, or the 5 GHz radio 205) of the gateway device 2.

At step S130, the method includes determining whether the input packet was received via a virtual interface (e.g., the first virtual interface for the WAN side, or the second virtual interface for the LAN side) associated with the first physical interface (e.g., the 6 GHz radio 206). For example, the gateway device 2 may make the determination based on interface configuration data stored in the memory 24 (e.g., virtual interface table 240) of the gateway device 2.

If the gateway device 2 determines that the input packet was received via a virtual interface (e.g., the first virtual interface associated with the WAN SSID, or the second virtual interface associated with the LAN SSID) that is associated with the first physical interface (e.g., the 6 GHz radio 206), "Yes" at step S130, then the method includes performing virtual input interface processing to manage the flow of the input packet to the router for packet forward processing, depending on the input virtual interface (e.g., the virtual WAN interface, or the virtual LAN interface), at step S140. On the other hand, if the gateway device 2 determines that the input packet was received via another physical interface (e.g., the Ethernet port 203, the 2.4 GHz radio 204, or the 5 GHz radio 205), which does not have a virtual interface configured in association therewith, "No" at step S130, the input packet may bypass the virtual input processing and be forwarded directly to the router of the gateway device 2 for packet forward processing.

At step S150, the method includes receiving the input packet at the router of the gateway device 2, which performs the packet forward processing in accordance with known techniques, and outputs the packet. For example, the packet may be output by the router to be transmitted at the first physical interface (e.g., the 6 GHz radio 206) of the gateway device 2. Alternatively, the packet may be output to be transmitted at another physical interface (e.g., the Ethernet port 203, the 2.4 GHz radio 204, or the 5 GHz radio 205) of the gateway device 2.

At step S160, the method includes determining whether the output packet is to be transmitted via a virtual interface associated with the first physical interface (e.g., the 6 GHz radio 206). For example, the gateway device 2 may make the determination based on interface configuration data stored in the memory 24 (e.g., the virtual interface table 240) of the gateway device 2.

If the gateway device 2 determines that the output packet is to be transmitted via a virtual interface (e.g., the first virtual interface associated with the WAN SSID, or the second virtual interface associated with the LAN SSID) that is associated with the first physical interface (e.g., the 6 GHz radio 206), "Yes" at step S160, then the method includes performing virtual output interface processing to manage the flow of the output packet to the first physical interface for output from the gateway device 2, depending on the output virtual interface (e.g., the virtual WAN interface, or the virtual LAN interface) and the corresponding QoS policy (e.g., associated with the WAN SSID or the LAN SSID), at step S170. On the other hand, if the gateway device 2 determines that the output packet is to be transmitted via another physical interface (e.g., the Ethernet port 203, the 2.4 GHz radio 204, or the 5 GHz radio 205), which does not have a virtual interface configured in association therewith, "No" at step S160, the output packet may bypass the virtual output processing and be forwarded directly to the other physical interface of the gateway device 2 for output.

At step S180, the method includes transmitting the output packet at the corresponding physical interface of the gateway device 2, based on the determination of step S160. For example, the packet may be transmitted at the first physical interface (e.g., the 6 GHz radio 206) of the gateway device 2 via a virtual interface (e.g., the first virtual interface associated with the WAN SSID, or the second virtual interface associated with the LAN SSID). Alternatively, the packet transmitted at the other physical interface (e.g., the Ethernet port 203, the 2.4 GHz radio 204, or the 5 GHz radio 205) of the gateway device 2.

Additional details of the above-described operations of the packet input phase and the packet output phase of the method of FIG. 7 will be described below in connection with FIGS. 8 and 9, respectively.

Figure 8:
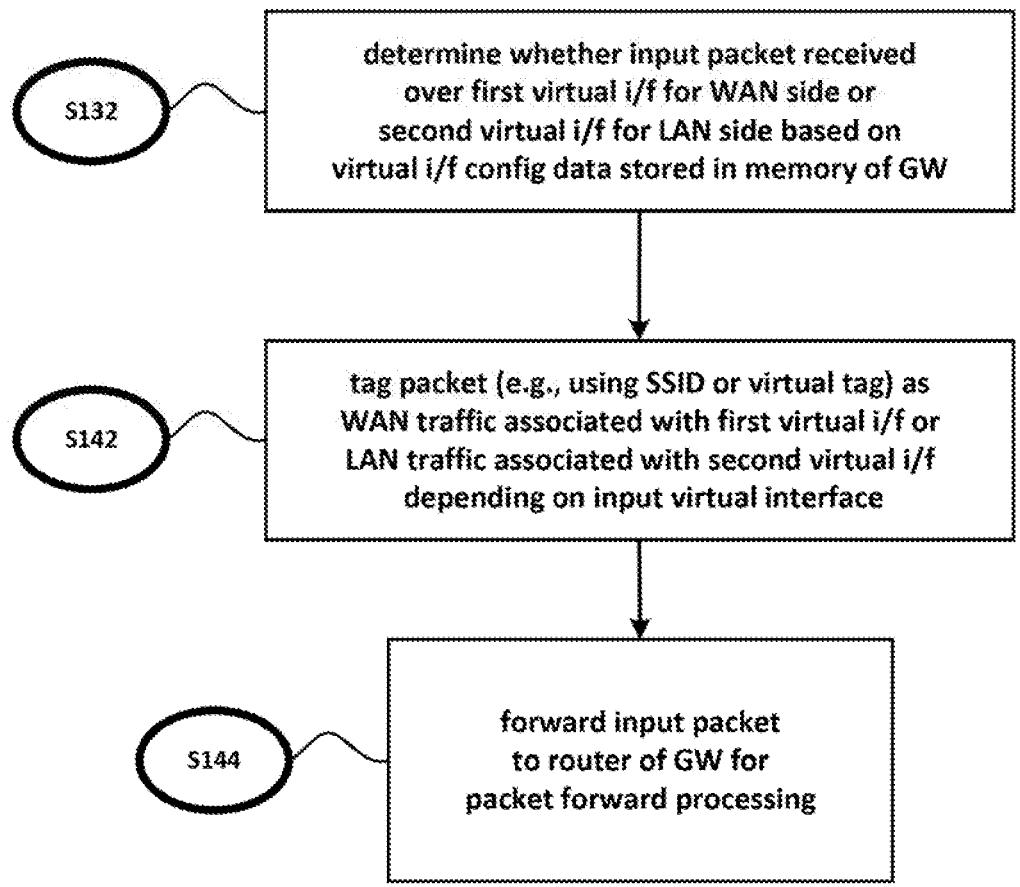
FIG. 8 is a flow chart illustrating further details of the packet input phase of the method for providing multiple virtual interfaces over a single physical interface of FIG. 7, according to an embodiment of the present disclosure.

FIG. 8 is a flow chart illustrating further details of the packet input phase of the method for providing multiple virtual interfaces over a single physical interface of FIG. 7, according to an embodiment of the present disclosure.

Referring to FIG. 8, step S130 of FIG. 7 may include determining whether the input packet was received over the first virtual interface for the WAN side or the second virtual interface for the LAN side, based on virtual interface configuration data stored in the memory 24 (e.g., the virtual interface table 240) of the gateway device 2, at step S132. If the result of the determination at step S130 of FIG. 7 was positive (YES at step S130), then step S140 of FIG. 7 (virtual input processing) may include tagging the input packet as WAN traffic associated with the first virtual interface or LAN traffic associated with the second virtual interface (e.g., using the WAN SSID or the LAN SSID, and/or using a virtual WAN tag or a virtual LAN tag), depending on which of the first virtual interface and the second virtual interface is the input virtual interface associated with the input packet, at step S142. Then, at step S144, the tagged input packet is forwarded to the router of the gateway device 2 for packet forward processing.

Figure 9:
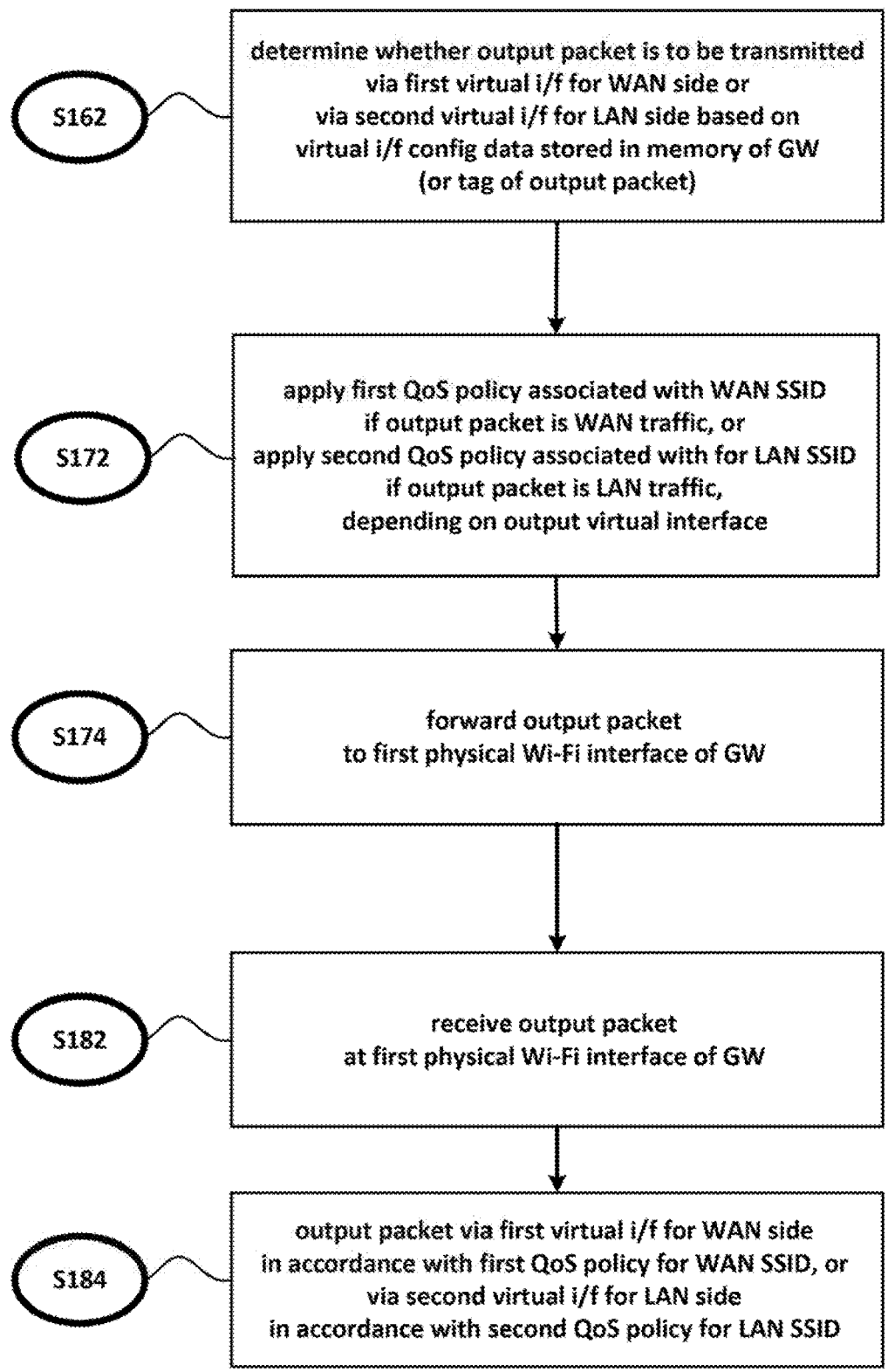
FIG. 9 is a flow chart illustrating further details of the packet output phase of the method for providing multiple virtual interfaces over a single physical interface of FIG. 7, according to an embodiment of the present disclosure.

FIG. 9 is a flow chart illustrating further details of the packet output phase of the method for providing multiple virtual interfaces over a single physical interface of FIG. 7, according to an embodiment of the present disclosure.

Referring to FIG. 9, step S160 of FIG. 7 may include determining whether the output packet is to be transmitted via the first virtual interface for the WAN side or via the second virtual interface for the LAN side, based on the virtual interface configuration data stored in the memory 24 (e.g., virtual interface table 240) of the gateway device 2, at step S162. In some example embodiments, the determination may additionally or alternatively be based on the tagging of the output packet as WAN traffic associated with the first virtual interface or LAN traffic associated with the second virtual interface (e.g., using the WAN SSID or the LAN SSID, and/or using a virtual WAN tag or a virtual LAN tag), at step S142 of FIG. 8. If the result of the determination at step S160 of FIG. 7 was positive (YES at step S160), then step S170 of FIG. 7 (virtual output processing) may include applying the first QoS policy associated with the WAN SSID if the output packet is WAN traffic or applying the second QoS policy associated with the LAN SSID if the output packet is LAN traffic, depending on which of the first virtual interface and the second virtual interface is the output virtual interface associated with the output packet, at step S172.

As mentioned above, the respective QoS policies may serve to allocate available bandwidth (e.g., in the 6 GHz radio frequency band) in various ways, according to example embodiments of the present disclosure. For example, applying the first QoS policy or the second QoS policy at step S172 may include one or more of: (1) allocating a first portion of available 6 GHz bandwidth to the WAN SSID associated with the first virtual interface, and allocating a second portion of available 6 GHz bandwidth to the LAN SSID associated with the second virtual interface for the LAN side; (2) allocating one or more sub-portions of the second portion of the available 6 GHz bandwidth to one or more client devices 4 connected to the second virtual interface for the LAN side; (3) assigning a priority among different services over each of the first virtual interface for the WAN side and the second virtual interface for the LAN side; and/or (4) assigning a priority among different client devices over each of the first virtual interface for the WAN side and the second virtual interface for the LAN side. For example, the priority among the services may be voice, video, and data (in order from highest priority to lowest priority), and/or the priority among the client devices may be security devices, wireless extender devices, and all other client devices (in order from highest priority to lowest priority). In some other example embodiments, a certain minimum amount or ratio of bandwidth may be reserved for the WAN communications. In some example embodiments, the portions, ratios, percentages, amounts, priorities, and the like that are defined by the respective QoS policies for the WAN SSID and the LAN SSID can be adjusted periodically or dynamically in response to changing network conditions, the addition or removal of various devices, and various other reasons so as to render the disclosed techniques suitable for different network implementations and configurations.

At step S174, the output packet is forwarded to the first physical Wi-Fi interface (e.g., the 6 GHz radio 206) of the gateway device 2 for output from the gateway device 2.

At step S182, the output packet is received at the first physical Wi-Fi interface (e.g., the 6 GHz radio 206) of the gateway device 2. Then, the gateway device 2 transmits the output packet via the first virtual interface for the WAN side in accordance with the first QoS policy for the WAN S SID, or via the second virtual interface for the LAN side in accordance with the second QoS policy for the LAN SSID, at step S184.

Advantageously, the traffic between the WAN and the LAN can be processed through the router function of the gateway device 2 in the same manner as having physically separate WAN interfaces and LAN interfaces with the above-described configuration techniques. In addition, since both WAN traffic and LAN traffic will be passing through a single physical interface (e.g., 6 GHz radio), customized quality of service (QoS) mechanisms may be applied. For example, the QoS mechanisms may be configured to allocate bandwidth to the WAN traffic and the LAN traffic, respectively, in order to simulate two separate physical interfaces.

In some example embodiments, the gateway device 2 may use the connected SSID (the WAN SSID and/or the LAN SSID) to distinguish and separate the WAN traffic and the LAN traffic from each other. In some other example embodiments, the WAN traffic and the LAN traffic may be tagged by the gateway device 2 using virtual tagging techniques (e.g., vWAN tag and vLAN tag) in order to distinguish and separate the WAN traffic and the LAN traffic from each other. In yet some other example embodiments, there may be various other ways to parcel out the bandwidth of the single physical 6 GHz Wi-Fi radio between the virtual WAN interface and the virtual LAN interface, so that both sets of communications can occur simultaneously.

Although the method of FIGS. 5-9 is discussed in connection with a gateway device 2 according to some example embodiments, the method could similarly be performed by a wireless extender 3, a wireless access point (AP), and/or other similar Wi-Fi networking devices according to some other example embodiments. The gateway device 2 may be programmed with instructions (e.g., controller instructions) to perform the virtual interface function in some example embodiments, or may use its native software in some other example embodiments. Additionally or alternatively, some aspects of example embodiments of the present disclosure may be implemented via Wi-Fi firmware of the gateway device 2, the wireless extenders 3, a wireless AP, or the like. In FIGS. 5-9, it is assumed that the devices include their respective controllers or processors and their respective software stored in their respective memories, as discussed above in connection with FIGS. 2-3, which when executed by their respective controllers or processors perform the functions and operations in accordance with the example embodiments of the present disclosure (e.g., including performing a virtual interface function).

Each of the elements of the present invention may be configured by implementing dedicated hardware or a software program on a memory controlling a processor to perform the functions of any of the components or combinations thereof. Any of the components may be implemented as a CPU or other processor reading and executing a software program from a recording medium such as a hard disk or a semiconductor memory, for example. The processes disclosed above constitute examples of algorithms that can be affected by software, applications (apps, or mobile apps), or computer programs. The software, applications, computer programs or algorithms can be stored on a non-transitory computer-readable medium for instructing a computer, such as a processor in an electronic apparatus, to execute the methods or algorithms described herein and shown in the drawing figures. The software and computer programs, which can also be referred to as programs, applications, components, or code, include machine instructions for a programmable processor, and can be implemented in a high-level procedural language, an object-oriented programming language, a functional programming language, a logical programming language, or an assembly language or machine language.

The term "non-transitory computer-readable medium" refers to any computer program product, apparatus or device, such as a magnetic disk, optical disk, solid-state storage device (SSD), memory, and programmable logic devices (PLDs), used to provide machine instructions or data to a programmable data processor, including a computer-readable medium that receives machine instructions as a computer-readable signal. By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media.

The word "comprise" or a derivative thereof, when used in a claim, is used in a nonexclusive sense that is not intended to exclude the presence of other elements or steps in a claimed structure or method. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. Use of the phrases "capable of," "configured to," or "operable to" in one or more embodiments refers to some apparatus, logic, hardware, and/or element designed in such a way to enable use thereof in a specified manner.

While the principles of the inventive concepts have been described above in connection with specific devices, apparatuses, systems, algorithms, programs and/or methods, it is to be clearly understood that this description is made only by way of example and not as limitation. The above description illustrates various example embodiments along with examples of how aspects of particular embodiments may be implemented and are presented to illustrate the flexibility and advantages of particular embodiments as defined by the following claims, and should not be deemed to be the only embodiments. One of ordinary skill in the art will appreciate that based on the above disclosure and the following claims, other arrangements, embodiments, implementations and equivalents may be employed without departing from the scope hereof as defined by the claims. It is contemplated that the implementation of the components and functions of the present disclosure can be done with any newly arising technology that may replace any of the above-implemented technologies. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What we claim is:

1. A gateway device for providing multiple virtual interfaces over a first physical Wi-Fi interface of the gateway device, the gateway device comprising:

a memory storing computer-readable instructions; and a processor configured to execute the computer-readable instructions to:

configure the first physical Wi-Fi interface of the gateway device with a first virtual interface of the multiple virtual interfaces for a wide area network (WAN) side of the gateway device and a second virtual interface of the multiple virtual interfaces for a local area network (LAN) side of the gateway device, wherein the first physical Wi-Fi interface is a single physical Wi-Fi interface, wherein the first physical Wi-Fi interface comprises a radio, and wherein, when configuring the first physical Wi-Fi interface, the processor is further configured to:

assign a first service set identifier (WAN SSID) to the first virtual interface for the WAN side of the gateway device;

assign a second service set identifier (LAN SSID) to the second virtual interface for the LAN side of the gateway device; and store the WAN SSID and the LAN SSID in the memory of the gateway device as virtual interface configuration data associated with the first physical Wi-Fi interface;

receive a packet at the first physical Wi-Fi interface of the gateway device;

determine whether the packet is received via the first virtual interface based on the virtual interface configuration data stored in the memory of the gateway device, the second virtual interface based on the virtual interface configuration data stored in the memory of the gateway device, or another physical interface of the gateway device; and perform virtual input processing to manage flow of the packet to a router of the gateway device based on the determining that the packet is received via the first virtual interface or the second virtual interface, wherein, when performing the virtual input processing, the processor is further configured to:

tag the packet as WAN traffic associated with the first virtual interface based on the WAN SSID, or tag the packet as LAN traffic associated with the second virtual interface based on the LAN SSID; and forward the packet to the router of the gateway device for packet forward processing;

wherein the radio comprises a single 6 gigahertz (GHz) radio for establishing a 6 GHz backhaul connection to a WAN adaptor and one or more wireless devices, wherein the gateway device configures the one or more wireless devices to communicate with the gateway device using the LAN SSID and configures the WAN adaptor to communicate with the gateway device using the WAN SSID, and wherein: if when the packet is received at the first virtual interface, the packet forward processing outputs the packet through the second virtual interface to at least one of the one or more wireless devices using the LAN SSID; and if when the packet is received at the second virtual interface, the packet forward processing outputs the packet through the first virtual interface to the WAN adaptor using the WAN SSID.

2. The gateway device of claim 1, wherein configuring the first physical Wi-Fi interface with the first virtual interface for the WAN side and the second virtual interface for the LAN side further includes:
creating a respective quality of service (QOS) policy for each of the WAN SSID assigned to the first virtual interface for the WAN side and the LAN SSID assigned to the second virtual interface for the LAN side; and
storing the respective QoS policy in association with each of the WAN SSID and the LAN SSID in the memory of the apparatus as the virtual interface configuration data associated with the first physical Wi-Fi interface.

3. The gateway device of claim 2, wherein, when performing the virtual input processing to manage the flow of the packet to the router of the gateway device depending on the input virtual interface, the processor is further configured to:
tag the packet with the WAN SSID or a virtual WAN (vWAN) tag in response to determining that the packet is received over the first virtual interface for the WAN side; and
tag the packet with the LAN SSID or a virtual LAN (vLAN) tag in response to determining that the packet is received over the second virtual interface for the LAN side.

4. The gateway device of claim 3, wherein the processor is further configured to execute the computer-readable instructions to:
receive the packet at the router of the gateway device, wherein the router performs the packet forward processing and outputs the packet;
determine whether the packet output from the router is to be transmitted over the first virtual interface for the WAN side or the second virtual interface for the LAN side based on the virtual interface configuration data stored in the memory of the gateway device or based on the tagging of the packet; and
in response to determining that the packet is to be transmitted over the first virtual interface for the WAN side or the second virtual interface for the LAN side, perform virtual output processing to manage flow of the packet to the first physical Wi-Fi interface depending on the output virtual interface.

5. The gateway device of claim 4, wherein:
when performing the virtual output processing to manage the flow of the packet to the first physical Wi-Fi interface depending on the output virtual interface, the processor is further configured to:
apply a first QoS policy for the WAN SSID in response to determining that the packet is to be transmitted over the first virtual interface for the WAN side, or apply a second QoS policy for the LAN SSID in response to determining that the packet is to be transmitted over the second virtual interface for the LAN side; and
forward the packet to the first physical Wi-Fi interface; and the processor is further configured to execute the computer-readable instructions to: receive the packet at the first physical Wi-Fi interface of the gateway device; and
output the packet at the first physical Wi-Fi interface of the gateway device over the first virtual interface for the WAN side in accordance with the first QoS policy for the WAN SSID, or over the second virtual interface for the LAN side in accordance with the second QoS policy for the LAN SSID.

6. The apparatus of claim 5, wherein:
the radio of the first physical Wi-Fi interface is a single 6 GHz radio that is virtualized to provide both a WAN interface and a LAN interface using the same 6 GHz radio; and
the first virtual interface associated with the WAN SSID provides a dedicated 6 GHz wireless backhaul between a WAN adaptor connected to the WAN side of the gateway device, the gateway device, and one or more extender devices connected to the LAN side of the gateway device,
wherein the WAN adaptor associates to the WAN SSID of the first virtual interface for the WAN side of the gateway device and the one or more extender devices associate to the LAN SSID of the second virtual interface for the LAN side of the gateway device.

7. The apparatus of claim 6, wherein the respective QoS policy for the WAN SSID or the LAN SSID includes one or more of:
allocating a first portion of available 6 GHz bandwidth to the WAN SSID associated with the first virtual interface for the WAN side, and allocating a second portion of the available 6 GHz bandwidth to the LAN SSID associated with the second virtual interface for the LAN side;
allocating one or more sub-portions of the second portion of the available 6 GHZ bandwidth to one or more client devices connected to the second virtual interface for the LAN side;
assigning a priority among different services over each of the first virtual interface for the WAN side and the second virtual interface for the LAN side; and
assigning a priority among different client devices over each of the first virtual interface for the WAN side and the second virtual interface for the LAN side.

8. A method for providing multiple virtual interfaces over a first physical Wi-Fi interface of a gateway device, the method comprising:
configuring the first physical Wi-Fi interface of the gateway device with a first virtual interface of the multiple virtual interfaces for a wide area network (WAN) side of the gateway device and a second virtual interface of the multiple virtual interfaces for a local area network (LAN) side of the gateway device, wherein the first physical Wi-Fi interface comprises a radio, and wherein configuring the first physical Wi-Fi interface includes:
assigning a first service set identifier (WAN SSID) to the first virtual interface;
assigning a second service set identifier (LAN SSID) to the second virtual interface; and
storing the WAN SSID and the LAN SSID in a memory of the gateway device as virtual interface configuration data associated with the first physical Wi-Fi interface;
receiving a packet at the first physical Wi-Fi interface of the gateway device;
determining whether the packet is received via the first virtual interface based on the virtual interface configuration data stored in the memory of the gateway device, or the second virtual interface side based on the virtual interface configuration data stored in the memory of the gateway device, or another physical interface of the gateway device; and performing virtual input processing to manage flow of the packet to a router of the gateway device based on the determining that the packet is received via the first virtual interface or the second virtual interface, wherein the virtual input processing includes:

tagging the packet as WAN traffic associated with the first virtual interface based on the WAN SSID, or tagging the packet as LAN traffic associated with the second virtual interface based on the LAN SSID; and forwarding the packet to the router of the gateway device for packet forward processing;

wherein the radio comprises a single 6 gigahertz (GHz) radio for establishing a 6 GHz backhaul connection to a WAN adaptor and one or more wireless devices, wherein the gateway device configures the one or more wireless devices to communicate with the gateway device using the LAN SSID and configures the WAN adaptor to communicate with the gateway device using the WAN SSID, and wherein: if when the packet is received at the first virtual interface, the packet forward processing outputs the packet through the second virtual interface to at least one of the one or more wireless devices using the LAN SSID; and if when the packet is received at the second virtual interface, the packet forward processing outputs the packet through the first virtual interface to the WAN adaptor using the WAN SSID.

9. The method of claim 8, wherein configuring the first physical Wi-Fi interface with the first virtual interface for the WAN side and the second virtual interface for the LAN side further includes:

creating a respective quality of service (QOS) policy for each of the WAN SSID assigned to the first virtual interface for the WAN side and the LAN SSID assigned to the second virtual interface for the LAN side; and storing the respective QoS policy in association with each of the WAN SSID and the LAN SSID in the memory of the gateway device as the virtual interface configuration data associated with the first physical Wi-Fi interface.

10. The method of claim 9, wherein performing the virtual input processing to manage the flow of the packet to the router of the gateway device depending on the input virtual interface includes:

tagging the packet with the WAN SSID or a virtual WAN (vWAN) tag in response to determining that the packet is received over the first virtual interface for the WAN side; and tagging the packet with the LAN SSID or a virtual LAN (vLAN) tag in response to determining that the packet is received over the second virtual interface for the LAN side.

11. The method of claim 10, further comprising:

receiving the packet at the router of the gateway device, wherein the router performs the packet forward processing and outputs the packet;

determining whether the packet output from the router is to be transmitted over the first virtual interface for the WAN side or the second virtual interface for the LAN side based on the virtual interface configuration data stored in the memory of the gateway device or based on the tagging of the packet; and in response to determining that the packet is to be transmitted over the first virtual interface for the WAN side or the second virtual interface for the LAN side, performing virtual output processing to manage flow of the packet to the first physical Wi-Fi interface depending on the output virtual interface.

12. The method of claim 11, wherein:

performing the virtual output processing to manage the flow of the packet to the first physical Wi-Fi interface depending on the output virtual interface includes:

applying a first QoS policy for the WAN SSID in response to determining that the packet is to be transmitted over the first virtual interface for the WAN side, or applying a second QoS policy for the LAN SSID in response to determining that the packet is to be transmitted over the second virtual interface for the LAN side; and forwarding the packet to the first physical Wi-Fi interface; and the method further comprises:

receiving the packet at the first physical Wi-Fi interface of the gateway device; and outputting the packet at the first physical Wi-Fi interface of the gateway device over the first virtual interface for the WAN side in accordance with the first QoS policy for the WAN SSID, or over the second virtual interface for the LAN side in accordance with the second QoS policy for the LAN SSID.

13. The method of claim 12, wherein:

the radio of the first physical Wi-Fi interface is a single 6 GHz radio that is virtualized to provide both a WAN interface and a LAN interface using the same 6 GHz radio;

the first virtual interface associated with the WAN SSID provides a dedicated 6 GHz wireless backhaul between a WAN adaptor connected to the WAN side of the gateway device, the gateway device, and one or more extender devices connected to the LAN side of the gateway device, wherein the WAN adaptor associates to the WAN SSID of the first virtual interface for the WAN side of the gateway device and the one or more extender devices associate to the LANSSID of the second virtual interface for the LAN side of the gateway device; and the respective QoS policy for the WAN SSID or the LAN SSID includes one or more of:

allocating a first portion of available 6 GHz bandwidth to the WAN SSID associated with the first virtual interface for the WAN side, and allocating a second portion of the available 6 GHz bandwidth to the LAN SSID associated with the second virtual interface for the LAN side; allocating one or more sub-portions of the second portion of the available 6 GHz bandwidth to one or more client devices connected to the second virtual interface for the LAN side;

assigning a priority among different services over each of the first virtual interface for the WAN side and the second virtual interface for the LAN side; and assigning a priority among different client devices over each of the first virtual interface for the WAN side and the second virtual interface for the LAN side.

14. A non-transitory computer-readable medium storing one or more programs for providing multiple virtual interfaces over a first physical Wi-Fi interface of a gateway device, which when executed by a processor of the gateway device, cause the gateway device to perform operations comprising:

configuring the first physical Wi-Fi interface of the gateway device with a first virtual interface for a wide area network (WAN) side of the gateway device and a second virtual interface for a local area network (LAN) side of the gateway device, wherein the first physical Wi-Fi interface comprises a radio, and wherein configuring the first physical Wi-Fi interface includes:

assigning a first service set identifier (WAN SSID) to the first virtual interface of the gateway device;

assigning a second service set identifier (LAN SSID) to the second virtual interface; and storing the WAN SSID and the LAN SSID in a memory of the gateway device as virtual interface configuration data associated with the first physical Wi-Fi interface;

receiving a packet at the first physical Wi-Fi interface of the gateway device;

determining whether the packet is received via the first virtual interface based on the virtual interface configuration data stored in the memory of the gateway device, or the second virtual interface based on the virtual interface configuration data stored in the memory of the gateway device, or another physical interface of the gateway device; and performing virtual input processing to manage flow of the packet to a router of the gateway device based on the determining that the packet is received via the first virtual interface or the second virtual interface, wherein the virtual input processing includes:

tagging the packet as WAN traffic associated with the first virtual interface based on the WAN SSID, or tagging the packet as LAN traffic associated with the second virtual interface based on the LAN SSID; and forwarding the packet to the router of the gateway device for packet forward processing;

wherein the radio comprises a single 6 gigahertz (GHz) radio for establishing a 6 GHz backhaul connection to a WAN adaptor and one or more wireless devices, wherein the gateway device configures the one or more wireless devices to communicate with the gateway device using the LAN SSID and configures the WAN adaptor to communicate with the gateway device using the WAN SSID, and wherein: if when the packet is received at the first virtual interface, the packet forward processing outputs the packet through the second virtual interface to at least one of the one or more wireless devices using the LAN SSID; and if when the packet is received at the second virtual interface, the packet forward processing outputs the packet through the first virtual interface to the WAN adaptor using the WAN SSID.

15. The computer-readable medium of claim 14, wherein configuring the first physical Wi-Fi interface with the first virtual interface for the WAN side and the second virtual interface for the LAN side further includes:

creating a respective quality of service (QOS) policy for each of the WAN SSID assigned to the first virtual interface for the WAN side and the LAN SSID assigned to the second virtual interface for the LAN side; and storing the respective QoS policy in association with each of the WAN SSID and the LAN SSID in the memory of the gateway device as the virtual interface configuration data associated with the first physical Wi-Fi interface.

16. The computer-readable medium of claim 15, wherein performing the virtual input processing to manage the flow of the packet to the router of the gateway device depending on the input virtual interface includes:

tagging the packet with the WAN SSID or a virtual WAN (vWAN) tag in response to determining that the packet is received over the first virtual interface for the WAN side; and tagging the packet with the LAN SSID or a virtual LAN (vLAN) tag in response to determining that the packet is received over the second virtual interface for the LAN side.

17. The computer-readable medium of claim 16, wherein the one or more programs, when executed by the processor of the gateway device, further cause the gateway device to perform operations comprising:

receiving the packet at the router of the gateway device, wherein the router performs the packet forward processing and outputs the packet;

determining whether the packet output from the router is to be transmitted over the first virtual interface for the WAN side or the second virtual interface for the LAN side based on the virtual interface configuration data stored in the memory of the gateway device or based on the tagging of the packet; and in response to determining that the packet is to be transmitted over the first virtual interface for the WAN side or the second virtual interface for the LAN side, performing virtual output processing to manage flow of the packet to the first physical Wi-Fi interface depending on the output virtual interface.

18. The computer-readable medium of claim 17, wherein:

performing the virtual output processing to manage the flow of the packet to the first physical Wi-Fi interface depending on the output virtual interface includes:

applying a first QoS policy for the WAN SSID in response to determining that the packet is to be transmitted over the first virtual interface for the WAN side, or applying a second QoS policy for the LAN SSID in response to determining that the packet is to be transmitted over the second virtual interface for the LAN side; and forwarding the packet to the first physical Wi-Fi interface; and the one or more programs, when executed by the processor of the gateway device, further cause the gateway device to perform operations comprising:

receiving the packet at the first physical Wi-Fi interface of the gateway device; and outputting the packet at the first physical Wi-Fi interface of the gateway device over the first virtual interface for the WAN side in accordance with the first QoS policy for the WAN SSID, or over the second virtual interface for the LAN side in accordance with the second QoS policy for the LAN SSID.

19. The computer-readable medium of claim 18, wherein:

the radio of the first physical Wi-Fi interface is a single 6 GHz radio that is virtualized to provide both a WAN interface and a LAN interface using the same 6 GHz radio;

the first virtual interface associated with the WAN SSID provides a dedicated 6 GHz wireless backhaul between a WAN adaptor connected to the WAN side of the gateway device, the gateway device, and one or more extender devices connected to the LAN side of the gateway device, wherein the WAN adaptor associates to the WAN SSID of the first virtual interface for the WAN side of the gateway device and the one or more extender devices associate to the LAN SSID of the second virtual interface for the LAN side of the gateway device; and the respective QoS policy for the WAN SSID or the LAN SSID includes one or more of:

allocating a first portion of available 6 GHz bandwidth to the WAN SSID associated with the first virtual interface for the WAN side, and allocating a second portion of the available 6 GHz bandwidth to the LAN SSID associated with the second virtual interface for the LAN side; allocating one or more sub-portions of the second portion of the available 6 GHz bandwidth to one or more client devices connected to the second virtual interface for the LAN side;

assigning a priority among different services over each of the first virtual interface for the WAN side and the second virtual interface for the LAN side; and assigning a priority among different client devices over each of the first virtual interface for the WAN side and the second virtual interface for the LAN side.

* * * * *